(12) United States Patent
Sekiyama et al.

(10) Patent No.: US 8,217,777 B2
(45) Date of Patent: Jul. 10, 2012

(54) VEHICLE ENVIRONMENTAL SERVICE SYSTEM

(75) Inventors: Hiroaki Sekiyama, Tokyo (JP); Shinichi Hayashi, Tokyo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 312 days.

(21) Appl. No.: 12/298,171

(22) PCT Filed: Apr. 24, 2007

(86) PCT No.: PCT/JP2007/058857
§ 371 (c)(1),
(2), (4) Date: Dec. 2, 2008

(87) PCT Pub. No.: WO2007/125920
PCT Pub. Date: Nov. 8, 2007

(65) Prior Publication Data
US 2009/0091439 A1    Apr. 9, 2009

(30) Foreign Application Priority Data
Apr. 25, 2006 (JP) .................................. 2006-121163

(51) Int. Cl.
*B60Q 1/00* (2006.01)
(52) U.S. Cl. ......................................... 340/459; 340/439
(58) Field of Classification Search .................. 340/459, 340/576; 200/226; 710/29–35
See application file for complete search history.

(56) References Cited

U.S. PATENT DOCUMENTS

| | | | |
|---|---|---|---|
| 4,247,757 A * | 1/1981 | Crump, Jr. ................ | 235/61 J |
| 4,928,090 A * | 5/1990 | Yoshimi et al. ............ | 340/575 |
| 5,485,381 A * | 1/1996 | Heintz et al. .............. | 701/93 |
| 5,612,882 A * | 3/1997 | LeFebvre et al. .......... | 701/423 |
| 6,161,071 A * | 12/2000 | Shuman et al. ............ | 701/48 |

(Continued)

FOREIGN PATENT DOCUMENTS
EP    1 560 186 A2    8/2005
(Continued)

OTHER PUBLICATIONS

Extended EP Search Report issued Jun. 9, 2011.

*Primary Examiner* — Daniel Wu
*Assistant Examiner* — Mohamed Barakat
(74) *Attorney, Agent, or Firm* — Kenyon & Kenyon LLP

(57) ABSTRACT

A vehicle environmental service system includes an in-vehicle information terminal mounted in a vehicle, a center server provided in a center, and a provider terminal managed by an affiliated service provider providing various services to users. The in-vehicle information terminal is capable of communicating with the provider terminal directly or through the center server. The in-vehicle information terminal or the center server has a point calculating unit for determining whether safety driving and/or ecological driving is being performed with respect to each of the users based on prescribed criteria and calculating the number of points to be awarded based on the result of the determination. The center server has a database for managing total number of points obtained by accumulating the number of points to be awarded with respect to each of the users. The provider terminal has a service providing unit for providing a prescribed service in exchange for a prescribed number of points in the database and an advertisement generating unit for generating advertisement information of the affiliated service provider. The in-vehicle information terminal has a unit enabling the in-vehicle information terminal to receive the advertisement information from the provider terminal directly or through the center server.

14 Claims, 18 Drawing Sheets

U.S. PATENT DOCUMENTS

| | | | |
|---|---|---|---|
| 6,714,860 B1 | 3/2004 | Wawra et al. | |
| 7,130,766 B2 * | 10/2006 | Tanase | 702/182 |
| 7,375,624 B2 * | 5/2008 | Hines et al. | 340/438 |
| 7,440,840 B2 * | 10/2008 | Tsukamoto et al. | 701/110 |
| 7,548,805 B2 * | 6/2009 | Yamaguchi et al. | 701/36 |
| 2002/0062191 A1 * | 5/2002 | Yanagisawa | 701/123 |
| 2005/0021191 A1 * | 1/2005 | Taniguchi et al. | 701/1 |

FOREIGN PATENT DOCUMENTS

| | | | |
|---|---|---|---|
| JP | 2000-247162 A | | 9/2000 |
| JP | 2000247162 A | * | 9/2000 |
| JP | 2002-189792 A | | 7/2002 |
| JP | 2002-230696 A | | 8/2002 |
| JP | 2002230696 A | * | 8/2002 |
| JP | 2002-304563 A | | 10/2002 |
| JP | 2002-373258 A | | 12/2002 |
| JP | 2003-099594 A | | 4/2003 |
| JP | 2003-178343 A | | 6/2003 |
| JP | 2003-312305 A | | 11/2003 |
| JP | 2004-234260 A | | 8/2004 |
| JP | 2005-016443 A | | 1/2005 |
| JP | 2005-018393 A | | 1/2005 |
| JP | 2005-030980 A | | 2/2005 |
| JP | 2005030980 A | * | 2/2005 |
| JP | 2005-174103 A | | 6/2005 |
| JP | 2006-030058 A | | 2/2006 |
| JP | 2006030058 A | * | 2/2006 |
| WO | 2005/109273 A1 | | 11/2005 |

* cited by examiner

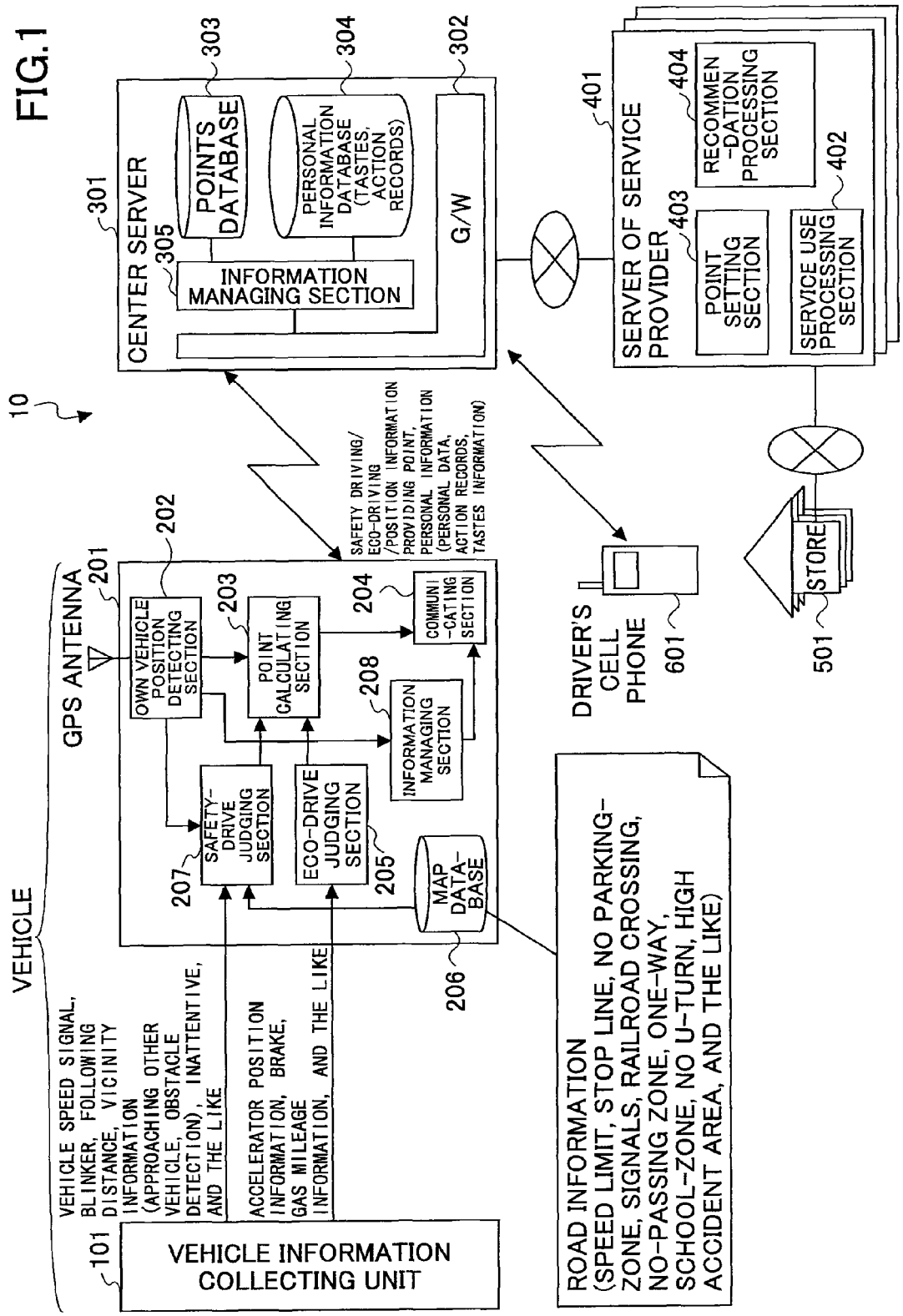

FIG.2

| JUDGMENT ITEMS | JUDGMENT CONDITIONS | POINT CONVERSION | COMMUTE (ROUND-TRIP) ONE-WAY 40 | HOLIDAY SHOPPING (ROUND-TRIP) | GROCERY SHOPPING (ROUND-TRIP) | DAY-TRIP LEISURE (ROUND-TRIP) | OVERNIGHT TRIP (ROUND-TRIP) ONE-WAY 3H |
|---|---|---|---|---|---|---|---|
| FOLLOWING DISTANCE | FOLLOWING DISTANCE IN ACCORDANCE WITH SPEED CAN BE KEPT FOR A CERTAIN PERIOD OF TIME | 1P/KEPT FOR 3 MIN. | 1 | 1 | 1 | 1 | 1 |
| SPEED LIMIT | DRIVE WITHIN SPEED LIMIT FOR A CERTAIN PERIOD OF TIME | 1P/KEPT FOR 5 MIN. | 1 | 1 | 1 | 2 | 4 |
| STOP | STOPPED AT STOP LINE | 1P/1 TIME | 2 | 2 | 2 | 6 | 8 |
| REDUCED SPEED | DRIVE WITH REDUCED SPEED (10KM OR LESS) WHERE NO STOP SIGNS AND IN SCHOOL ZONE. | 1P/1 TIME | 2 | 2 | 2 | 6 | 8 |
| SEAT BELT | FASTENED SEATBELT AFTER GETTING IN VEHICLE (DRIVERS SEAT AND FRONT PASSENGER SEAT) | 1P/1Trip | 2 | 2 | 2 | 4 | 8 |
|  | REAR SEAT BELT IS FASTENED | 1P/1Trip | 2 | 2 | 2 | 4 | 8 |
| USE OF BLINKER | BLINKER IS USED FROM 30 METERS BEFORE TURNING LEFT OR RIGHT | 1P/1 OPERATION | 4 | 4 | 4 | 10 | 20 |
|  | BLINKER IS USED 3 SECONDS BEFORE CHANGING LANE | 1P/1 OPERATION | 2 | 2 | 2 | 2 | 4 |
| SAFETY APPARATUS | CONGESTION FOLLOW-UP, LANE-KEEP ASSIST, NIGHT-VIEW, AFS, (BGM) FUNCTIONS ARE ACTIVATED | 1P/1 OPERATION | 2 | 2 | 2 | 4 | 8 |
| RECEIVED WHEN HANDS-FREE IS ON | PARK AT SAFETY AREA BEFORE TALKING |  | 1 | 1 | 1 | 1 | 1 |
|  | CHANGE MODE TO DRIVE MODE | 1P/1 OPERATION | 1 | 1 | 1 | 1 | 1 |
|  | HANG UP TO CALL BACK |  | 1 | 1 | 1 | 1 | 1 |
| SEAT POSITION | GOOD DRIVING POSTURE (LESS THAN X DEGREE OF SEAT ANGLE) | 1P/1Trip | 1 | 2 | 2 | 4 | 8 |
| CROSS ROAD AND WALKWAY | ONCE STOPPED BEFORE CROSSING PATHWAY, WALKWAY, OR ROAD FOR ENTERING INTO GARAGE FACING ROAD ETC. | 1P/1 TIME | 2 | 2 | 2 | 4 | 4 |
| APPROACH OF EMERGENCY VEHICLE | PULL OFF VEHICLE TO STOP EXCEPT NEAR CROSSING DUE TO APPROACHING EMERGENCY VEHICLE | 1P/1 TIME | 1 | 1 | 1 | 1 | 1 |
| PASSING RAILROAD CROSSING | ONCE STOPPED BEFORE RAILROAD CROSSING | 1P/1 TIME | 1 | 1 | 1 | 1 | 1 |
| PARKING | PARKED AT PUBLIC PARKING | 1P/1 TIME | 0 | 1 | 1 | 1 | 2 |
| CURVE | REDUCED SPEED BEFORE CURVE | 1P/1 TIME | 1 | 1 | 1 | 1 | 2 |
| LEFT AND RIGHT BLIND CROSSING | REDUCED SPEED AT LEFT AND RIGHT BLIND CROSSING | 1P/1 TIME | 1 | 1 | 1 | 1 | 1 |
| DANGEROUS ACTION CHECK | KEPT FACE AND HAND INSIDE SUN ROOF WHILE MOVING | 1P/1 OPERATING DAY | 1 | 1 | 1 | 1 | 2 |
|  | NO WARNING LAMP IS TUNED ON DURING DRIVING | 1P/1 OPERATING DAY | 1 | 1 | 1 | 1 | 2 |
| BRAKING OPERATION | ENGINE BRAKE IS USED TO REDUCE SPEED IN DOWNHILL SLOPE | 1P/1 TIME | 2 | 2 | 2 | 4 | 8 |
| DRIVE FATIGUE | TOOK REST (5-MIN. PARKING (TENTATIVE)) WITHIN 2-HOUR DRIVE | 1P/1 TIME | 0 | 0 | 0 | 2 | 4 |
| PARKING | BACK VEHICLE WITHOUT OPENING DOOR | 1P/1 TIME | 2 | 2 | 2 | 4 | 8 |
| CHILD IN VEHICLE | LOCKED POWER WINDOW | 1P/1Trip | 1 | 2 | 2 | 4 | 8 |

FIG.3

| JUDGMENT ITEMS | JUDGMENT CONDITIONS | POINT CONVERSION | COMMUTE (ROUND-TRIP) ONE-WAY 40 | HOLIDAY SHOPPING (ROUND-TRIP) | GROCERY SHOPPING (ROUND-TRIP) | DAY-TRIP LEISURE (ROUND-TRIP) | OVERNIGHT TRIP (ROUND-TRIP) ONE-WAY 3H |
|---|---|---|---|---|---|---|---|
| ECOLOGY | 5-MIN. IDLING OR LESS | 1P/1 TIME | 2 | 2 | 2 | 4 | 8 |
| | DRIVE WITH APPROPRIATE PNEUMATIC PRESSURE | 1P/1 OPERATING DAY | 1 | 1 | 1 | 1 | 1 |
| | FASTEN SEAT BELT BEFORE IGNITION IS ON | 1P/1Trip | 2 | 2 | 2 | 4 | 8 |
| | MOMENTARY GAS MILEAGE MAX VALUE LASTS FOR 20 SEC OR LONGER | 1P/1 TIME | 2 | 2 | 2 | 2 | 2 |
| | BETTER GAS MILEAGE THAN REFERENCE GAS MILEAGE | 1P/1Trip | 2 | 2 | 2 | 4 | 8 |
| | N-RANGE IS USE IN 30-SECOND STOPPING | 1P/1 TIME | 1 | 1 | 1 | 2 | 4 |
| | B-RANGE IS USED IN DECELERATING SPEED | 1P/1 TIME | 1 | 2 | 2 | 4 | 8 |
| | LOAD CARRYING CAPACITY IS LESS THAN XX KG | 1P/1 OPERATING DAY | 1 | 1 | 1 | 1 | 1 |
| | XX DEGREE IS SET FOR AIR CONDITIONING (COOLER) WHEN OUTSIDE TEMPERATURE IS XX DEGREE | 1P/1Trip | 2 | 2 | 2 | 4 | 8 |
| | OWN VEHICLE POSITION IS TRANSMITTED TO CENTER | 1P/1Trip | 1 | 1 | 1 | 2 | 4 |

FIG.4

| USER ID | TOTAL NUMBER OF POINTS |
|---|---|
| 000001 | 20 |
| 000002 | 100 |
| 000003 | 50 |
| 000004 | 3 |

| USER ID | SKILL LEVEL | BASIC INFORMATION OF VEHICLE | HOBBY | FREQUENTLY VISITED RESTAURANTS | MAIN ACTIVITY AREAS | FREQUENTLY VISITED PLACES | NECESSARY ADVERTISEMENT |
|---|---|---|---|---|---|---|---|
| 000001 | A | GAS MIDDLE CLASS SEDAN EQUIPMENT... | SHOPPING | ITALIAN | DOWNTOWN | SHOP | PROVIDER "A": ○ OTHERS: × |
| 000002 | A | HYBRID MIDDLE CLASS SEDAN EQUIPMENT... | TRAVELING | CHINESE | SUBURB | SUPERMARKET | ALL: × |
| 000003 | C | HYBRID SUV EQUIPMENT... | SPORTS | KOREAN, JAPANESE | DOWNTOWN, SUBURB | SPORTS GYM | ALL: ○ |
| 000004 | B | FUEL BATTERY MINI-VEHICLE EQUIPMENT... | READING BOOKS | GENERAL FAST FOODS | MOUNTAINOUS | GAME HALL | ALL: × |
| ... | ... | ... | ... | ... | ... | ... | ... |

FIG.7

| USER ID | TOTAL NUMBER OF POINTS | ECO-POINTS EARNING RATE (%) | SAFETY POINTS EARNING RATE (%) |
|---|---|---|---|
| 0000001 | 20 | 66 | 70 |
| 0000002 | 300 | 50 | 40 |
| 0000003 | 50 | 45 | 60 |
| 0000004 | 3 | 10 | 8 |
| ... | ... | ... | ... |

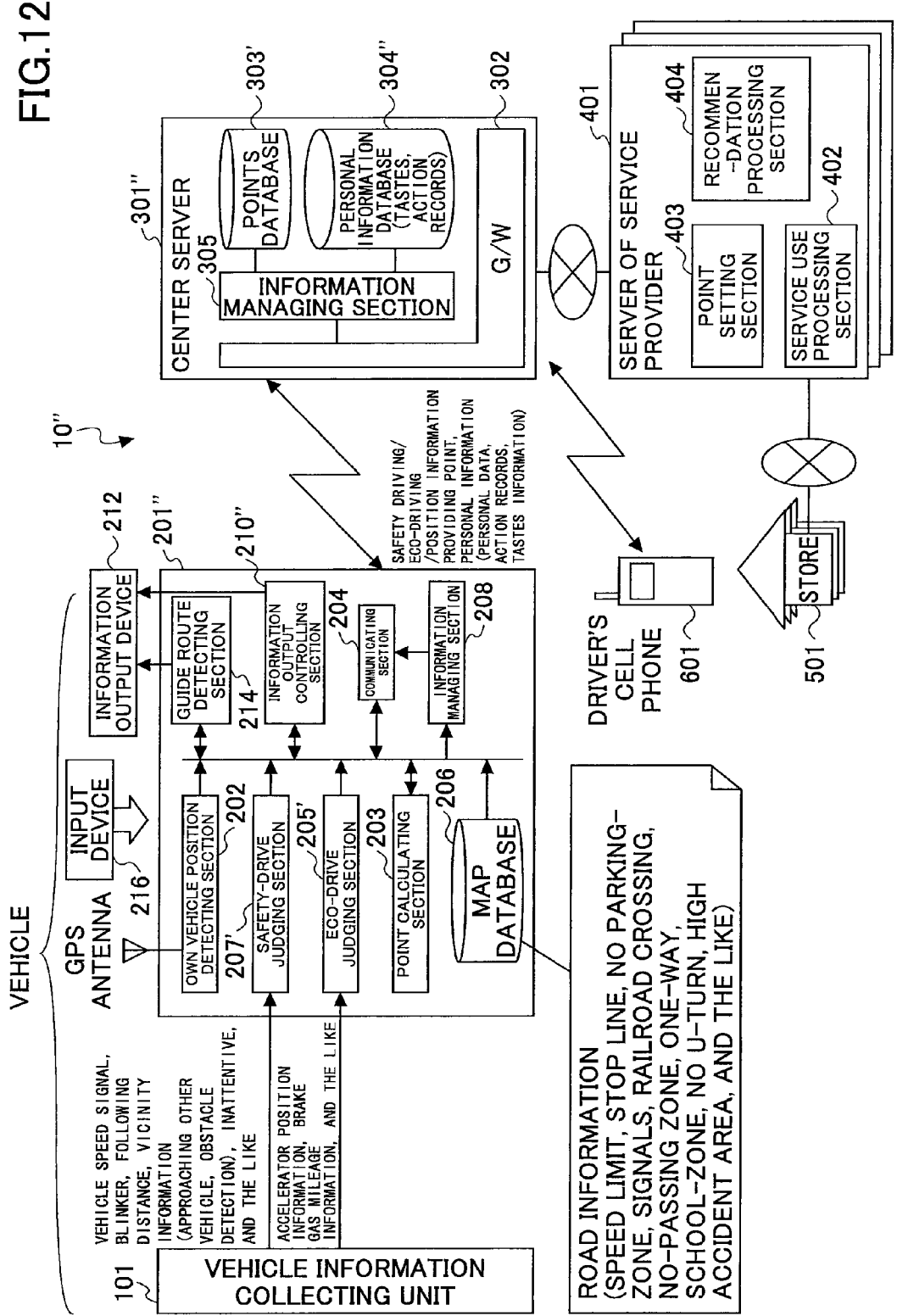

FIG.13

| USER ID | SKILL LEVEL | BASIC INFORMATION OF VEHICLE | HOBBY | FREQUENTLY VISITED RESTAURANTS | MAIN ACTIVITY AREAS | FREQUENTLY VISITED PLACES | ECO-POINTS EARNING SPOTS | SAFETY POINTS EARNING SPOTS | PREVIOUSLY USED SERVICES |
|---|---|---|---|---|---|---|---|---|---|
| 000001 | A | GAS MIDDLE CLASS SEDAN EQUIPMENT... | SHOPPING | ITALIAN | DOWNTOWN | SHOP | LINK 1,... | LINK 31,... | PROVIDER "A" SERVICE "A1" (3 TIMES) SERVICE "A2" (3 TIMES) |
| 000002 | A | HYBRID MIDDLE CLASS SEDAN EQUIPMENT... | TRAVELING | CHINESE | SUBURB | SUPERMARKET | LINK 21,... | LINK 131,... | NONE |
| 000003 | C | HYBRID SUV EQUIPMENT... | SPORTS | KOREAN, JAPANESE | DOWNTOWN, SUBURB | SPORTS GYM | LINK 31,... | LINK 311,... | PROVIDER "D" SERVICE "D1" (5 TIMES) SERVICE "D2" (3 TIMES) |
| 000004 | B | FUEL BATTERY MINI-VEHICLE EQUIPMENT... | READING BOOKS | GENERAL FAST FOODS | MOUNTAINOUS | PARK | LINK 12,... | LINK 321,... | NONE |
| ... | ... | ... | ... | ... | ... | ... | ... | ... | ... | ns
VEHICLE ENVIRONMENTAL SERVICE SYSTEM

This is a 371 national phase application of PCT/JP2007/058857 filed 24 Apr. 2007, which claims priority to Japanese Patent Application No. 2006-121163 filed 25 Apr. 2006, the contents of which are incorporated herein by reference.

TECHNICAL FIELD

The present invention relates to a vehicle environmental service system including an in-vehicle information terminal mounted in a vehicle, a center server provided in a center, and a provider terminal managed by an affiliated service provider providing various services to the users.

BACKGROUND ART

Conventionally, there has been known a vehicle driving information managing method in which a server receives vehicle driving information related to the driving records of the vehicle from an in-vehicle information terminal apparatus, judges the driving status of the vehicle using the received vehicle driving information, calculates the reward and penalty to be awarded based on result of the judgement result, and records and holds the reward and penalty points based on the calculated reward and penalty (see, for example, Patent Document 1). The benefits of calculated reward and penalty points have been passed on to the users when, for example, the users pay their insurance fee and use e-commerce settlement.

Further, there have been known an eco-drive evaluation system including an eco-drive evaluation apparatus and a reward awarding server for awarding a benefit to a user who uses a vehicle which is a target of an eco-drive evaluation in accordance with the results of the eco-drive evaluation performed by the eco-drive evaluation system. The eco-drive evaluation apparatus includes a detecting unit for detecting whether the vehicle is in idling-stop condition based on the physical values of the vehicle measured by a monitoring apparatus, an evaluating unit for performing an eco-drive evaluation based on the detection results in a certain period of time by the detecting unit, and a transmitting unit for transmitting the information obtained by adding the identification information of the user using the vehicle to the eco-drive evaluation information indicating the results of the eco-drive evaluation. The reward awarding server includes a receiving unit for receiving the eco-drive evaluation information from the eco-drive evaluation apparatus via a communication network, a storage unit for associating and storing the identification information of the user using the vehicle with accumulated number of points, and controlling unit for obtaining the number of reward points based on the eco-drive evaluation information and, in accordance with the obtained number of reward points, updating the accumulated number of points with respect to the identification information of the user added to the eco-drive evaluation information (see, for example, Patent Document 2). The benefits of the number of reward points are passed on to the users by providing, for example, fuel or premium gifts.

In addition, similar related art cases are known (see Patent Documents 3 through 5).

[Patent document 1] Japanese Patent Application Publication No. 2002-230696
[Patent document 2] Japanese Patent Application Publication No. 2005-16443
[Patent document 3] Japanese Patent Application Publication No. 2003-178343
[Patent document 4] Japanese Patent Application Publication No. 2004-234260
[Patent document 5] Japanese Patent Application Publication No. 2002-189792

DISCLOSURE OF THE INVENTION

Problem to be Solved by the Invention

However, the configuration described in each of the Patent Documents above has limited expandability and is unsatisfactory as a comprehensive service to the users. Further, from a viewpoint of the affiliated service providers, the benefits earned by providing their services are also limited. Therefore, unfortunately, further affiliation with new service providers is not well promoted and the systems is not mutually beneficial for both affiliated service providers and users.

Therefore, an object of the present invention is to provide a vehicle environmental service system that has excellent expandability and that is mutually beneficial for either affiliated service providers or users.

Means for Solving Problem

To achieve the above object, according to a first aspect of the present invention, there is provided a vehicle environmental service system including an in-vehicle information terminal mounted in a vehicle; a center server provided in a center; a provider terminal managed by an affiliated service provider providing various services to users; a point calculating unit included in the in-vehicle information terminal or the center server and provided for determining whether safety driving and/or ecological driving are being performed with respect to each of the users based on prescribed criteria and calculating the number of points to be awarded based on the result of the determination; a database included in the center server and provided for managing total number of points obtained by accumulating the number of points to be awarded with respect to each of the users; a service providing unit included in the provider terminal and providing a prescribed service in exchange for a prescribed number of points in the database; an advertisement generating unit included in the provider terminal and generating advertisement information of the affiliated service provider; and a unit enabling the in-vehicle information terminal to receive the advertisement information from the provider terminal directly or through the center server.

According to a second aspect of the present invention, there is provided the vehicle environmental service system according to the first aspect, in which a database of driving proficiency indicating an index of driving skill or driving technique with respect to each of the users is made and a point calculation method in the point calculating unit is varied in accordance with the driving proficiency.

According to a third aspect of the present invention, there is provided the vehicle environmental service system according to the first or the second aspect, in which a database of safety driving functions or ecological driving functions is mounted in the vehicle owned by the user with respect to each of the users and a point calculation method in the point calculating unit is varied in accordance with the situation of the safety driving functions or the ecological driving functions.

According to a fourth aspect of the present invention, there is provided the vehicle environmental service system according to any one of the first through the third aspect, in which a point calculation method in the point calculating unit is varied in accordance with the external environment of the vehicle.

According to a fifth aspect of the present invention, there is provided the vehicle environmental service system according to any one of the first through the fourth aspect, further including a driving advice presenting unit included in the vehicle and provided for presenting driving advice for earning a point.

According to a sixth aspect of the present invention, there is provided the vehicle environmental service system according to the first through the sixth aspects, in which the driving advice for earning the points is presented in a points earning opportunity lost case where the points are not earned because the prescribed criterion is not fulfilled in a situation where the points can be earned.

According to a seventh aspect of the present invention, there is provided the vehicle environmental service system according to any one of the first through the fifth aspects, in which the driving advice for earning the points is presented when the number of times or a frequency of points earning opportunity lost cases where the points are not earned because the prescribed criterion is not fulfilled in a situation where the point that can be earned exceed a prescribed reference value.

According to an eighth aspect of the present invention, there is provided the vehicle environmental service system according to any one of the first through the seventh aspects, further including a guiding unit included in the vehicle and provided for presenting guidance to make a diagnosis of the vehicle when it is determined that gas mileage of the vehicle is not improved regardless of earning the points due to ecological driving.

According to a ninth aspect of the present invention, there is provided the vehicle environmental service system according to any one of the first through the eighth aspects, further including a route guiding unit included in the vehicle and provided for performing route guidance by preferentially selecting a route on which the points are most likely to be earned based on a driving record in the past.

According to a tenth aspect of the present invention, there is provided the vehicle environmental service system according to any one of the first through the ninth aspects, further including a service guiding unit included in the vehicle and provided for performing guidance of a service available in a facility when the vehicle approaches the facility of the affiliated service provider where the service is available or when there is the facility located on a guide road of the vehicle.

According to an eleventh aspect of the present invention, there is provided the vehicle environmental service system according to the tenth aspect, in which the service guiding unit performs guidance in a manner so that a service adapted to the user's taste is preferentially guided to rather than the other services.

According to a twelfth aspect of the present invention, there is provided the vehicle environmental service system according to any one of the first through the eleventh aspects, further including a POI (Point Of Interest) information presenting unit included in the vehicle and provided for preferentially presenting information of the affiliated service provider when POI information is being presented.

According to a thirteenth aspect of the present invention, there is provided the vehicle environmental service system according to the twelfth aspect, in which the POI (Point Of Interest) information presenting unit preferentially presents information of the affiliated service provider that has previously provided a service to the user.

According to a fourteenth aspect of the present invention, there is provided the vehicle environmental service system according to the first aspect, further including a personal information database included in the center server and provided for collecting and storing information of each user of the in-vehicle information terminal, in which the advertisement generating unit generates the advertisement information by communicating with the center server and referring to the information in the personal information database.

Effect of the Invention

According to an embodiment of the present invention, it is possible to provide a vehicle environmental service system that has excellent expandability and that is mutually beneficial for both affiliated service providers and users.

BRIEF DESCRIPTION OF THE DRAWINGS

FIG. 1 is a diagram showing a system configuration of a vehicle environmental service system 10 according to an example 1 of the present invention;

FIG. 2 is a table showing an example of a safety-drive-induced point awarding method realized by a safety-drive judgeing section 207 and a point calculating section 203;

FIG. 3 is a table showing an example of a eco-drive-induced point awarding method realized by a eco-drive judging section 205 and a point calculating section 203;

FIG. 4 is a table showing an example of data stored in a points database 303;

FIG. 5 is a table showing an example of data stored in a personal information database 304;

FIG. 7 is a table showing an example of data stored in a points database 303' of a center server 301';

FIG. 12 is a diagram showing a system configuration of a vehicle environmental service system 10" according to an example 3 of the present invention;

FIG. 13 is a table showing an example of data stored in a personal information database 304" of a center server 301";

Figure 6:
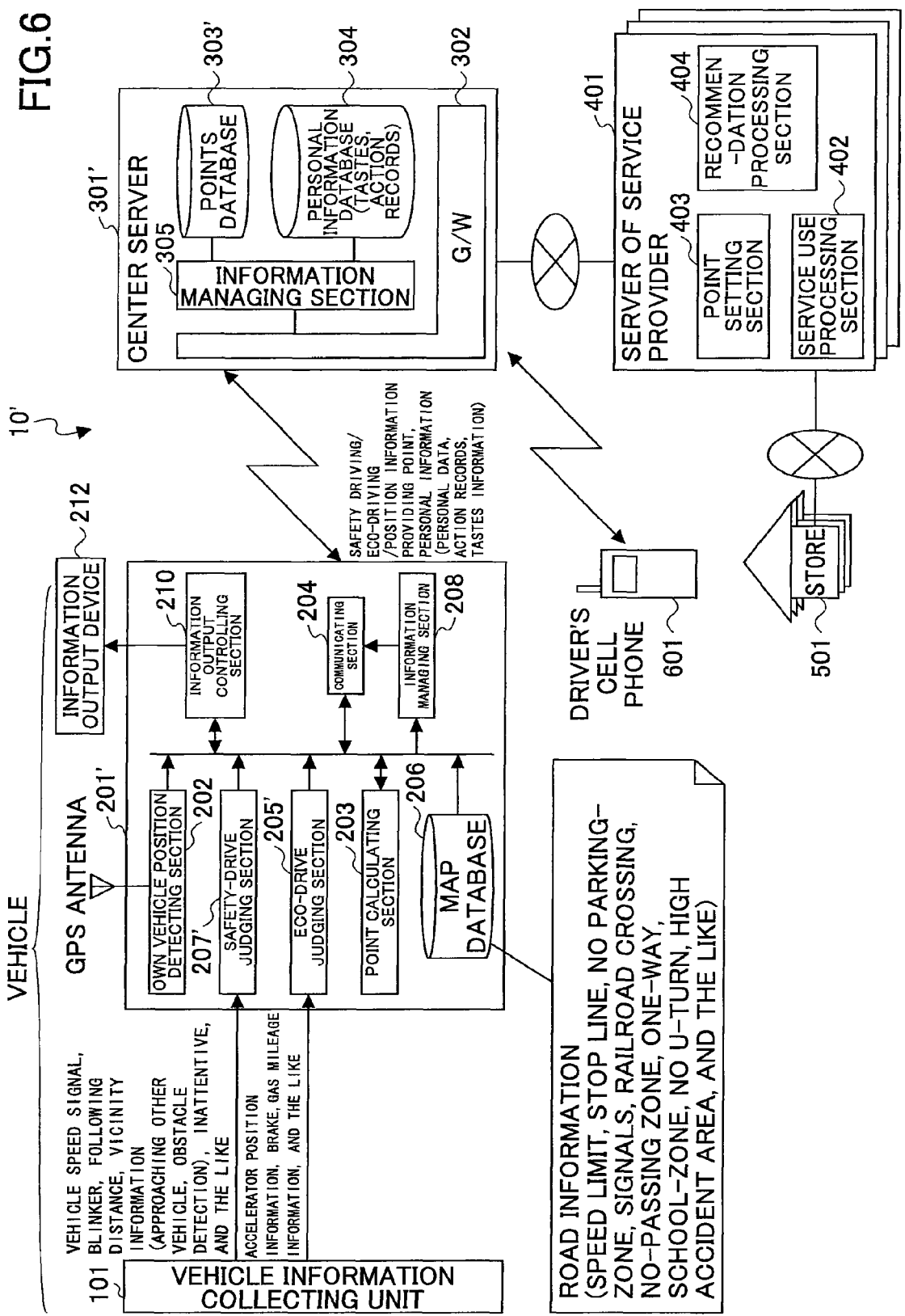
FIG. 6 is a diagram showing a system configuration of a vehicle environmental service system 10' according to an example 2 of the present invention.

EXPLANATION OF LETTERS AND NUMERALS 10,10',10": Vehicle environmental service system
201,201',201": In-vehicle information terminal
202: Own vehicle position detecting section
203: Point calculating section
204: Communicating section
205: Eco-drive judging section
206: Map database
207: Safety-drive judging section
208: Information managing section
301,301',301": Center server
302: Network gateway
305: Information managing section
303,303': Points database
304,304": Personal information database
401: Provider terminal
402: Service use processing section
403: Point setting section
404: Recommendation processing section

BEST MODE FOR CARRYING OUT THE INVENTION

In the following, the best mode for carrying out the present invention divided into several examples is described with reference to the drawings.

Example 1

FIG. 1 is a system configuration drawing showing an example 1 of the vehicle environmental service system according to an embodiment of the present invention. In this example, the vehicle environmental service system 10 includes an in-vehicle information terminal 201 mounted in the vehicle, a center server 301 provided in a center, and a provider terminal 401 managed by an affiliated service provider providing various services to the users. The provider terminal 401 is provided with respect to each affiliated service provider and plural provider terminals 401 may be provided. The center server 301 may include plural servers. In this case as well, the plural servers work together so as to work as a single center server 30.

The affiliated service provider has a store 501 as shown in FIG. 1. The store 501 may have various patterns depending on the services provided by the corresponding affiliated service provider. For example, an affiliated service provider providing food and drink may have the store 501 where the users can directly move in and out. On the other hand, an affiliated service provider distributing moving images and music via an electric communication line such as the Internet may have the store 501 other than the store where users can directly move in and out. In this case, the store 501 may be functionally integrated with the provider terminal 401.

The in-vehicle information terminal 201 and the provider terminal 401 can be in direct communication with each other or via the center server 301. In the example shown in FIG. 1, the in-vehicle information terminal 201 and the provider terminal 401 can be in communication via the center server 301. Further, the users (the drivers) may perform communications with the center server 301 or the provider terminal 401 using their own cell phones 601, the communications being necessary for exchanging various information items described below.

The in-vehicle information terminal 201 may be realized as a navigation apparatus. The in-vehicle information terminal 201 includes, as hardware, a microcomputer having, for example, a CPU, a ROM, and a RAM each connected with the others via a bus (not shown) and a communication module.

As shown in FIG. 1, the in-vehicle information terminal 201 includes an own vehicle position detecting section 202, a point calculating section 203, a communicating section 204, an eco-drive judging section 205, a map database 206, a safety-drive judging section 207, and a information managing section 208.

As shown in FIG. 1, the center server 301 includes a network gateway 302, an information managing section 305, a points database 303, and a personal information database 304.

The provider terminal 401 includes a service use processing section 402, a point setting section 403, and a recommendation processing section 404.

In the following, first, the configuration of the vehicle is described in detail.

The map database 206 includes map data. Similar to typical map data, the map data include coordinate information corresponding to road junctions (intersections), coordinate information of each node corresponding to the junctions of expressways, link information connecting neighboring nodes, width information of roads corresponding to each link, road type of interstate roads, prefectural roads, expressways, and the like corresponding to each link, and various road information items such as traffic regulations information corresponding to each link. Further, the road information may include speed limits, stop signs, no-parking zones, traffic signals, railroad crossings, no-passing zones, one-way roads, school zones, no U-turn areas, and high accident areas. As shown in FIG. 1, the map data in the map database 206 are mainly used in the safety-drive judging section 207. Further, the map database 206 includes POI (Point Of Interest) information about tourist spots and various facilities.

The own vehicle position detecting section 202 is connected to a GPS antenna. The own vehicle position is calculated based on a GPS signal output from a GPS satellite and received by a GPS receiver via the GPS antenna. The positioning method may be any method such as a single positioning method and a differential positioning method (including a interferometric positioning method). In this case, the own vehicle position may be corrected based on the output from various sensors such as a wheel speed sensor and a gyrosensor, or the various information items received through a beacon receiver and an FM multiple receiver. For example, in a D-GPS (Differential GPS) which is one of the differential positioning methods, the own vehicle is determined to be at a single position by calculating the distances from four or more GPS satellites and is corrected based on GPS correction data supplied from a receiver (reference station) installed at a known point (so called differential correction works: on the assumption that GPS signals received at two points include the same error, so that positioning accuracy is improved by subtracting the error). It should be noted that the GPS correction data are, for example, FM-multiple broadcasted periodically (for example, every five seconds) from plural reference stations installed across the country, and received by an in-vehicle FM multiple receiver. Further, the own vehicle position may be corrected irregularly by a known map matching technique using the map data in the map database 206 when necessary. For example, a locus of the own vehicle position (driving locus) is compared with the road shape in the map data, and while the comparison is made, the own vehicle position is corrected so as to be put on a point of the road. The thus-determined own vehicle position is supplied mainly to the safety-drive judging section 207 and the information managing section 208 in every calculation cycle.

The information managing section 208 identifies the current driver based on, for example, a personal identification result using an in-vehicle camera, an ID verification, or verification using biometric information, and manages driver information with respect to each driver (user). The driver information includes basic information (age, address, type of own vehicle, information about engine displacement, various equipment, and the like). Further, the information managing section 208 grasps and manages the destination and the registration time point set by a driver in a navigation apparatus as the driver information. Still further, the information managing section 208 grasps and manages the driver's frequently visited areas, places, and facilities as the driver information. The information managing section 208 transmits the driver information to a center (to be exact, the center server 301) via the communicating section 204. Still further, the information managing section 208 transmits the own vehicle position information detected by the own vehicle position detecting section 202 and point information of the number of points calculated by the point calculating section 203 described below to the center server 301 via the communicating section 204. It should be noted that the own vehicle position information may be transmitted periodically, and the point information may be transmitted to the center server 301 whenever points are awarded or transmitted to the center server 301 per one trip (one trip: from when an ignition switch is turned ON until the ignition switch is turned OFF).

Each of the eco-drive judging section 205 and the safety-drive judging section 207 is connected to a vehicle information collecting unit 101. The vehicle information collecting unit 101 is connected to various electronic parts (sensors and ECU) in the vehicle via an appropriate bus such as a CAN (Controller Area Network). The vehicle information collecting unit 101 obtains various vehicle information items via communications with the various electronic parts.

The vehicle information with respect to safety driving is supplied from the vehicle information collecting unit 101 to the safety-drive judging section 207. For example, as shown in FIG. 1, the vehicle information with respect to safety driving may include vehicle speed information obtained from a wheel speed sensor, information with respect to blinker operation, following-distance information, vicinity information (approaching of other cars, detection of obstacles) obtainable with a sonar, a radar, or a camera, or information such as inattentive operation obtainable via a in-vehicle camera and the like.

The safety-drive judging section 207 determines whether the driver is in a safety-drive status based on the own vehicle position information supplied as needed and the vehicle information with respect to safety driving, and outputs the determined result to the point calculating section 203. The point calculating section 203 performs point conversion in accordance with the degree of safety driving. Preferably, the point calculating section 203 awards the points to each driver (user) after identifying the current driver based on, for example, a personal identification result using an in-vehicle camera, an ID verification, or verification using biometric information. The number of points awarded by the point calculating section 203 (point information) is transmitted to the center server 301 and managed in the points database 303 of the center server 301.

FIG. 2 is a table showing an example of a point awarding method resulting from safety driving realized by the safety-drive judging section 207 and the point calculating section 203.

The point awarding method may be mapped as shown in FIG. 2 in a manner so that the number of awarded points in accordance with a using condition of the current vehicle are determined with respect to each judgment item. As shown in FIG. 2, the exemplary items of the using condition of the current vehicle are commuting (round-trip), holiday shopping (round-trip), grocery shopping (round-trip), day-trip leisure (round-trip), and overnight trip (round-trip).

As shown in FIG. 2, the judgment items with respect to safety driving may include a following distance, a following speed limit, a seatbelt, safety equipment, and driving fatigue. For example, with respect to the following distance, when an appropriate following distance is kept for a certain period of time in accordance with the vehicle speed, a prescribed number of points are awarded every three minutes. For example, in commuting hours, when safety driving keeping an appropriate following distance is performed for three minutes, the point calculating section 203 awards one point as shown in FIG. 2. Similarly, for example, in day-trip leisure, when an appropriate vehicle speed within a legal speed range is kept for five minutes, the point calculating section 203 awards two points as shown in FIG. 2. Similarly, in a vehicle equipped with, for example, a traffic congestion follow-up function to automatically maintaining an appropriate following distance at a low speed due to, for example, traffic congestion, a lane-keeping assist function to avoid the deviation from a driving lane, a night-view function using an infrared camera, and an AFS function to variably control the optical axes of headlights, when these functions are activated in an overnight trip, the point calculating section 203 awards eight points. Hereinafter, the points awarded when a judgment condition with respect to safety driving is fulfilled may be also referred to as "safety points".

Vehicle information with respect to ecological driving (eco-driving) is supplied from the vehicle information collecting unit 101 to the eco-drive judging section 205. As shown in FIG. 1, the vehicle information with respect to eco-driving may include accelerator position information (or throttle position information), information of braking operation, and gas mileage information.

The eco-drive judging section 205 judges whether the driver is in an eco-driving status based on the vehicle information with respect to eco-driving, and outputs the judgement result to the point calculating section 203. The point calculating section 203 performs point conversion in accordance with the degree of eco-driving. Preferably, the point calculating section 203 awards the points to each driver (user) after identifying the current driver based on, for example, a personal identification result using an in-vehicle camera, an ID verification, or verification using biometric information. The number of points awarded by the point calculating section 203 (point information) is transmitted to the center server 301 and managed in the center server 301.

FIG. 3 is a table showing an example of a point awarding method resulting from safety driving realized by the eco-drive judging section 205 and the point calculating section 203.

The point awarding method resulting from the eco-driving may be also mapped as shown in FIG. 3 in a manner so that the number of awarded points in accordance with, for example, a using condition of the current vehicle are determined with respect to each judgment item.

As shown in FIG. 2, the judgment items with respect to eco-driving may includes idling time, use of B-range, load carrying capacity, air-conditioner setting temperature, and own vehicle position notification. For example, with respect to the idling time, when the idling time is equal to or less than five minutes, the point calculating section 203 awards two points as shown in FIG. 3. Further, for example, in a hybrid vehicle equipped with the B-range, in holiday shopping, when the B-range is used in decelerating the speed, the point calculating section 203 awards two points as shown in FIG. 3. It should be noted that the variable speed range of the B-range is shifted to the decelerating side compared with that of a typical D-range also providing variable speed control so as to maximize the gas mileage characteristics and driving performance. In the B-range and when the acceleration is OFF, regenerative braking power is obtained by a motor generator. In this case, the motor generator serves as a generator and the kinetic energy of the vehicle is converted into electric energy and stored in an HV battery. Further, in grocery shopping, when the own vehicle position information generated by the own vehicle position detecting section 202 is transmitted to the center server 301 every a prescribed period of time, the point calculating section 203 awards one point as shown in FIG. 3. This is because the vehicle serves as a probe car, which prevents congestion occurring and contributes to eco-driving. It should be noted that since the own vehicle position information is a privacy matter, the driver can select to transmit or not to transmit by using, for example, an operating switch. It should be noted that the judgment condition whether the pneumatic pressure is appropriate for driving may be applied only to a vehicle having a pneumatic sensor. Further, the different reference gas mileages may be previously set depending on the type of vehicles and may be learned based on the vehicle information obtained from as many of the same type vehicles as needed.

Similarly, though not shown in FIG. 3, in a vehicle having a VVT (Variable Valve Timing mechanism), when the vehicle accelerates without issuing a timing advance request (closing timing of intake valves is advanced more than the usual case), prescribed points may be awarded. Further, similarly, though not shown in FIG. 3, in a hybrid vehicle, when the hydraulic brake (brake actuator) of the vehicle is not operated at a prescribed vehicle speed or more, prescribed points may be awarded. In this case, this is because it becomes possible to avoid converting the kinetic energy to be recovered as regenerative energy into thermal energy (frictional heat). In the following, the points awarded when the judgment condition is related to the eco-driving as described above are also referred to as "eco-point".

Next, a configuration of the center is described in detail.

The information managing section 305 manages various information items (such as driver information and point information) obtained from the in-vehicle information terminal 201 through the network gateway 302 as described above, and configures and updates the points database 303 and a personal information database 304 based on the various information items. Further, the information managing section 305 manages various information items (such as advertisement information and point using information that are described below) obtained from the provider terminal 401 through the network gateway 302 as described below, updates the data in the points database 303 when necessary based on the information from the provider terminal 401, and transmits, for example, the advertisement information from the provider terminal 401 to the in-vehicle information terminal 201 through the network gateway 302. It should be noted that a database of each of the various information items provided by the affiliated service providers may be made with respect to each of the affiliated service providers.

FIG. 4 is a drawing showing an example of the data stored in the points database 303. The points database 303 stores the data indicating the current points status with respect to each user. It should be noted that the example in FIG. 4 representatively shows only four users, but actually data of many users are stored. In the example in FIG. 4, the data of the points database 303 includes the current total number of points. The total number of points in the points database 303 may be periodically transmitted to the each user or supplied upon a request from a driver (for example, a request through the cell phone 601). By doing this, each driver can get to know her/his own total number of points periodically or at desired times.

FIG. 5 is a drawing showing an example of data stored in the personal information database 304. The personal information database 304 stores the individual information with respect to each user. It should be noted that the example in FIG. 5 representatively shows only four users, but actually data of many users are stored. In the example in FIG. 5, the contents of the data are expressed using letters for illustrative purposes but actually are stored in digital data (bit sequence) format.

In the example in FIG. 5, the data of the personal information database 304 include the information indicating the driver's driving level (skill level), the basic information indicating the type and equipment of the vehicle, the driver's frequently visited restaurants, the driver's main activity areas, the driver's frequently visited places, and necessary advertisement. The necessary advertisement is the information indicating the intention of the driver whether the distribution of the advertisement with respect to each of the affiliated service providers is necessary. The data related to the basic information of the vehicle, the interests of the driver, and the necessary advertisement may be generated based on the information input by the driver, and other items may be generated by learning based on the driver information obtained from the in-vehicle information terminal 201 as needed.

Next, a configuration of the affiliated service provider is described in detail. In the following, a configuration with respect to a single affiliated service provider "A" is described. However, another affiliated service provider may have a similar configuration. Herein, it is assumed that the affiliated service provider "A" provides services "A1" and "A2". The services refer to the activities such as providing a service itself at a lower cost than usual or with a greater added value than usual. For example, when the affiliated service provider "A" is a rent-a-car service provider, the service "A1" may be upgrading the vehicle type, and the service "A2" may be extending the service period.

The point setting section 403 determines and sets the number of points necessary to use the services "A1" and "A2". The number of points necessary to use the services "A1" and "A2" depends upon the characteristics and features of the services "A1" and "A2", and may fluctuate daily like an exchange rate or be a fixed value unchanged for a certain period of time. The information of the number of points necessary to use the services "A1" and "A2" may be on news broadcasts periodically sent to the users and browsable on a web page of the Internet, or transmitted along with advertisement information to the in-vehicle information terminal 201 to be displayed for the driver.

Upon receiving a request to use, for example, the service "A1" from a user (driver), the service use processing section 402 queries the information managing section 305 of the center server 301 about the current total number of points of the user. When receiving the inquiry, the information managing section 305 of the center server 301 extracts the total number of points of the user from the data stored in the points database 303 and supplies the total number of points of the user to the service use processing section 402. When the number of points necessary to use the service "A1" is within a range of the total number of points of the user, the service use processing section 402 transmits an acceptance message to the in-vehicle information terminal 201 directly or through the center server 301. At the same time, when necessary, the service use processing section 402 gives notice to the store 501 under control so that the user uses the service "A1". It should be noted that when the affiliated service provider "A" is, for example, a music distribution service provider and the service "A1" is to distribute certain music at no charge, the service use processing section 402 may transmit the music data to the in-vehicle information terminal 201 directly or through the center server 301 instead of or along with the acceptance message.

When a service contract is concluded (the acceptance message is transmitted), the service use processing section 402 transmits the number of points to be subtracted by providing the service to the center server 301. Upon receiving the number of points, the information managing section 305 of the center server 301 subtracts the number of points consumed due to use of the service from the total number of points of the driver in the points database 303. It should be noted that the actual subtraction from the total number of points may be performed when the service is actually provided.

The recommendation processing section 404 generates and distributes necessary advertisement information so that more drivers use the services "A1" and "A2". The advertisement information may be notification of preferred point exchange rate for limited periods only or notification of the addition of new services. The recommendation processing section 404 may distribute the advertisement information to the in-vehicle information terminal 201 or the cell phone 601 of the driver (user) who permits the distribution of the advertisement directly or through the center server 301. In the latter case, the information managing section 305 of the center server 301 refers to the personal information database 304 and distributes the advertisement information to only the drivers who permit the distribution of the advertisement information (for example, in the example in FIG. 5, a driver having the user ID "000001"). Further, the recommendation processing section 404 refers to the personal information database 304 of the center server 301 only for the users who permit the use of the personal information and generates the advertisement information adapted to the taste or preference of the users so as to transmit the advertisement information to the users. In this case, the user who permits to use of the personal information can effectively obtain the advertisement information adapted to her/his own taste or preference in consideration of providing personal information to the affiliated service providers. On the other hand, the affiliated service providers also can place various advertisement of their own through this system in consideration of reducing the margin per service to return the points and, in addition, receive the information of the desired users by referring to the personal information database 304 so as to develop their own advertisements. For example, it becomes possible to increase the cost-efficiency of the advertisement by referring to the personal information database 304 and distributing advertisements to only the users having an interest in the services. Further, it is also possible to detect and grasp, for example, the change or trend of the user's taste or preference by referring to the personal information database 304.

Next, a point calculation method that is performed by the point calculating section 203 and that may be adapted to the above vehicle environmental service system 10 is described.

The point calculating section 203 may vary the point calculation method in accordance with the skill level of the drivers. For example, in a case where the skill level of a driver is high, the point calculating section 203 uses partially relaxed criteria for judging the safety driving compared with the case where the skill level of a driver is low. The point calculating section 203 may judge the skill level of the driver by referring to the data (skill level) in the personal information database 304 of the center server 301 through communications with the center server 301. For example, regarding the criteria of the following distance, when the skill level of the driver is low, it is thought to be appropriate that the following distance at the vehicle speed of 100 km/hr is 100 meters or more. On the other hand, when the skill level of the driver is high, it is thought to be appropriate that the following distance at the vehicle speed of 100 km/hr is 80 meters or more. However, the criteria unrelated to the skill level such as seatbelts are not to be varied.

Otherwise, the point calculating section 203 may award bonus points to a driver having low skill level when the driver receives prescribed safety points. By doing like this, by varying the point awarding method according to the skill levels of the drivers, it becomes possible to appropriately compensate for the individual differences in the skill level.

Further, the point calculating section 203 may vary the point calculation method in accordance with the functions provide in the vehicles. The point calculating section 203 may judge the various functions provided in the vehicle by referring to the data (basic information of the vehicle) in the personal information database 304 of the center server 301. The point calculating section 203 may use partially relaxed criteria for judging the eco-driving or the safety driving with respect to a driver of a vehicle having no equipment advantageous to the eco-driving and the safety driving such as the regenerative function in a hybrid vehicle and an automatic cruising function compared with a driver of a vehicle equipped with such functions. This is because in a vehicle having no functions advantageous to the eco-driving or safety driving, higher skill or more labor becomes necessary to meet the criteria of the eco-driving or the safety driving accordingly. Therefore, it is reasonable to award the points compensating for the differences. For example, when a driver of the vehicle having no idle stop function voluntarily stops the engine during a temporal stop, one bonus point per one trip may be awarded as the eco-point. In the same manner, when a driver of the vehicle having no automatic following control function maintains an appropriate following distance for a certain period of time, one bonus point per one trip may be awarded. As described above, it becomes possible to compensate the differences in functions among the vehicles by varying the point awarding method in accordance with the functions equipped in the vehicles.

Further, the point calculating section 203 may vary the point calculation method in accordance with the external environment of the vehicles. The point calculating section 203 may judge the external environment of the vehicle based on the information obtained form the vehicle information collecting unit 101. For example, the external environment may be judged by using a rain sensor or a solar sensor. The flow of traffic (degree of congestion) may be judged based on the external recognition results from the congestion information obtained by the communications among vehicles or between roads and vehicles (including the communication with the center) and an anterior camera. A slope may be judged by using the map data in the map database 206 and an acceleration sensor. A road friction coefficient (icy road condition) may be judged based on each wheel speed sensor of the wheels. The point calculating section 203 may use partially relaxed criteria for judging the eco-driving or the safety driving in a case where the external environment is advantageous to the eco-driving or the safety driving compared with a case where the external environment is disadvantageous to the eco-driving or the safety driving. This is because, when the external environment is disadvantageous to the eco-driving or the safety driving, higher skill or more labor is required to meet the criteria of the eco-driving or the safety driving accordingly. Therefore, it is reasonable to award the points compensating for the differences. For example, in an external environment where there are many steep ascending slopes, the reference gas mileage used for evaluating the gas mileage may be corrected to be reduced compared with the external environment where there are many flat roads. Similarly, when safety points are awarded in the external environment of an icy road surface, one point per drive may be awarded as a bonus point. By doing like this, it becomes possible to compensate for the differences in external environments caused from the differences due to, for example, the activity area of each driver by varying the point awarding method in accordance with the external environments in the vicinity of the vehicles.

Further, in this example, the common point calculation method (calculation algorithm) used in the point calculating section 203 may be used among the vehicles by, for example, distributing the common point calculation method from the center server 301. The point calculation method used in the point calculating section 203 is stored in a rewritable memory and when the point calculation method is, for example, updated, the center server 301 distributes the latest point calculation method to each vehicle.

Example 2

The example 2 generally refers to a configuration for outputting appropriate advice at an appropriate timing to a driver so as to, for example, receive points effectively. In the following, the same reference numerals are used for the same elements in the above example 1 and the descriptions thereof are omitted.

FIG. 6 is a drawing showing a system configuration of the vehicle environmental service system 10' according to the example 2 of the present invention. FIG. 6 is a functional block diagram showing a main configuration of the in-vehicle information terminal 201'. In the configuration in FIG. 6, the in-vehicle information terminal 201' further includes an information output controlling section 210 in addition to the configuration of the in-vehicle information terminal 201 shown in FIG. 1. The information output controlling section 210 displays various information items to the user (driver) through an information output device 212. The information output device 212 may be any one of a display device for outputting various information items as images and a speaker for outputting various information items as voice or both.

The safety-drive judging section 207' determines whether the driver is in a safety driving status and outputs the determination result to the point calculating section 203. The point calculating section 203 performs point conversion in accordance with the degree of safety driving. Preferably, the point calculating section 203 awards the points to each driver (user) after identifying the current driver based on, for example, a personal identification result using an in-vehicle camera, an ID verification, or verification using biometric information. The number of points awarded by the point calculating section 203 (point information) is transmitted to the center server 301' and managed in the points database 303' of the center server 301'. The method of calculating safety points by the point calculating section 203 may be the same as that in the example 1.

Further, the safety-drive judging section 207' determines whether it is a case where the judgment condition for judging the safety driving is not fulfilled in a situation where the judgment condition could have been fulfilled (points earning opportunity lost case) based on the own vehicle position information and the vehicle information about the safety driving. It should be noted that the determination of the points earning opportunity lost case may be performed at any appropriate stage depending on the characteristics of each judgment item. For example, the judgment condition about the seatbelts is judged once per trip when the vehicle starts, and the judgment condition about stopping the vehicle may be judged whenever a stop position without a signal is detected. The safety-drive judging section 207' may transmit once per trip the number of points earning opportunity lost cases along with the point information to the center server 301' though the communicating section 204.

The eco-drive judging section 205' judges whether the driver is in an eco-driving status based on the vehicle information with respect to eco-driving, and outputs the judgement result to the point calculating section 203. The point calculating section 203 performs point conversion in accordance with the degree of eco-driving. Preferably, the point calculating section 203 awards the points to each driver (user) after identifying the current driver based on, for example, a personal identification result using an in-vehicle camera, an ID verification, or verification using biometric information. The number of points awarded by the point calculating section 203 (point information) is transmitted to the center server 301' and managed in the points database 303' in the center server 301'. The method of calculating the eco-points by the point calculating section 203 may be the same as that in the example 1.

Further, the eco-drive judging section 205' determines whether it is a case where the judgment condition for judging the eco-driving is not fulfilled in a situation where the judgment condition could have been fulfilled (points earning opportunity lost case) based on the vehicle information about the eco-driving. It should be noted that the determination of the points earning opportunity lost case may be performed at any appropriate stage depending on the characteristics of each judgment item. For example, whether the pneumatic pressure is appropriate for driving may be judged before starting the vehicle once per trip, and the judgment condition whether the B-range is used in decelerating the speed may be judged whenever in a decelerating status adapted to use the B-range.

FIG. 7 is a drawing showing an example of the data stored in the points database 303' of the center server 301'. The points database 303' includes data indicating the current point status with respect to each user. It should be noted that the example in FIG. 7 representatively shows only four users, but actually data of many users are stored. In the example in FIG. 7, the data of the points database 303' include the current total number of points, an index indicating the status of earning the eco-points (eco-points earning rate), and an index indicating the status of earning the safety driving (safety points earning rate).

The eco-points earning rate is a value dividing the number of cases where the judgment condition with respect to the eco-driving is fulfilled by the total number of cases where the judgment condition with respect to the eco-driving is fulfilled or could have been fulfilled. Therefore, the more a driver tries to practice eco-driving, the greater the eco-points earning rate is likely to be. Similarly, the safety points earning rate is a value dividing the number of cases where the judgment condition with respect to the safety driving is fulfilled by the total number of cases where the judgment condition with respect to the safety driving is fulfilled or could have been fulfilled.

Therefore, the more a driver tries to practice safety driving, the greater the safety points earning rate is likely to be. The eco-points earning rate and the safety points earning rate may be evaluated and calculated by the eco-drive judging section 205 and the safety-drive judging section 207, respectively, in the in-vehicle information terminal 201 and supplied to the center server 301.

Next, based on the above basic configuration, each information output control realized by the information output controlling section 210 according to an embodiment of the present invention is described.

Figure 8:
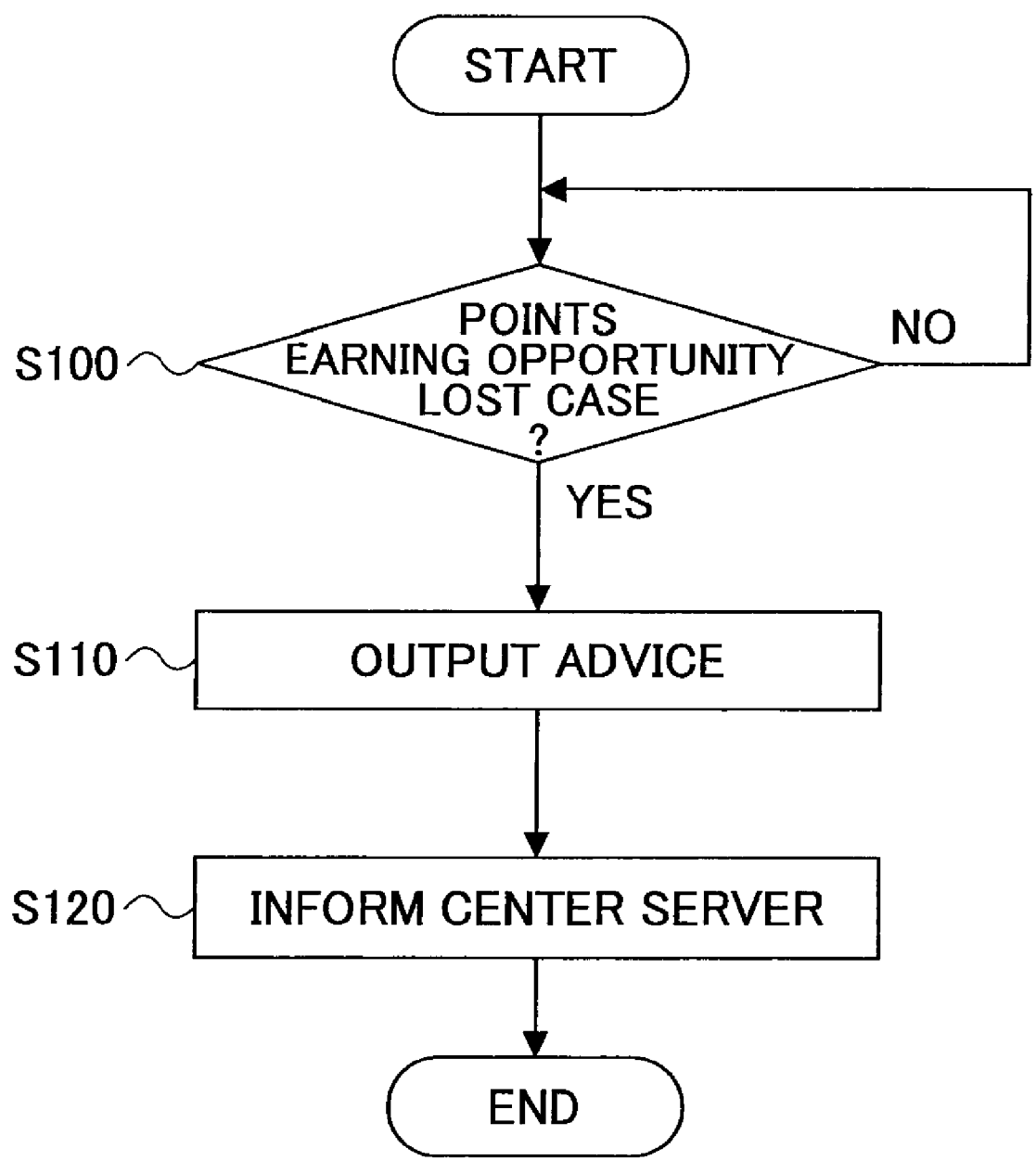
FIG. 8 is a flowchart showing a (first) example of an information output controlling process realized by an information output controlling section 210.

FIG. 8 is a flowchart showing an exemplary information output control realized by the information output controlling section 210. The processing routine in FIG. 8 may be started when the ignition switch is turned ON and repeated until the ignition switch is turned OFF.

In step 100, the information output controlling section 210 determines whether the points earning opportunity lost case is detected based on the judgement result by the safety-drive judging section 207' and the eco-drive judging section 205'. When the points earning opportunity lost case is detected, the process goes to step 110.

In step 110, the information output controlling section 210 outputs appropriate advice in accordance with the judgment condition of the points earning opportunity lost case. For example, in decelerating situations adapted to use the B-range, when the speed is decelerated without using the B-range, the points earning opportunity lost case is detected. In this case, the information output controlling section 210 outputs advice informing that the use of the B-range is effective to reduce the gas usage through the information output device 212.

In step 120, when necessary, the information output controlling section 210 informs the center server 301' that the points earning opportunity lost case is detected. When receiving the information, the information managing section 305 of the center server 301' updates the data (eco-points earning rate or the safety points earning rate) stored in the points database 303'.

Figure 9:
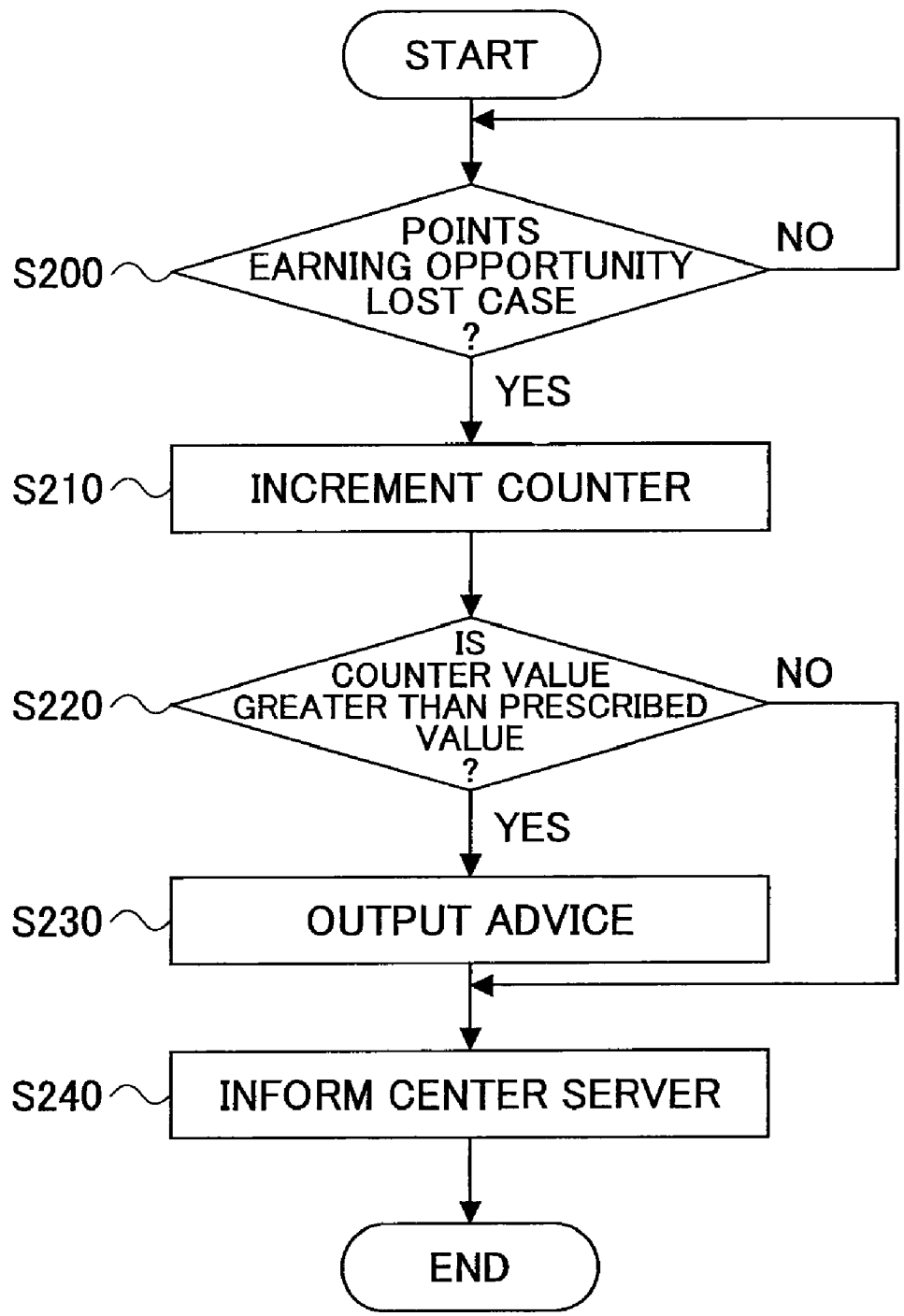
FIG. 9 is a flowchart showing another (second) example of an information output controlling process realized by an information output controlling section 210.

FIG. 9 is a flowchart showing another example of the image output control realized by the information output controlling section 210. The processing routine shown in FIG. 9 may be started when the ignition switch is turned ON and repeated until the ignition switch is turned OFF. It should be noted that a counter value is reset to zero when the ignition switch is turned ON.

In step 200, the information output controlling section 210 determines whether the points earning opportunity lost case is detected based on the judgement result by the safety-drive judging section 207' and the eco-drive judging section 205'. When the points earning opportunity lost case is detected, the process goes to step 210.

In step 210, the information output controlling section 210 increments the counter value by only one.

In step 220, the information output controlling section 210 determines whether the counter value exceeds a prescribed value. When the counter value exceeds the prescribed value, the process goes to step 230. When the counter value does not exceed the prescribed value, the information output controlling section 210 informs as needed the center server 301' that the points earning opportunity lost case is detected (step 240).

In step 230, the information output controlling section 210 judges the judgment condition of the points earning opportunity lost case and outputs appropriate advice. The advice output in this case may correspond to the judgment item related to the points earning opportunity lost case detected in this processing routine.

It should be noted that in this example, there may be two counters provided for separately counting the number of eco-points earning opportunity lost cases and the number of safety-points earning opportunity lost cases. In this case, when any one of the counter values exceeds the corresponding prescribed value, advice in accordance with the counter may be output. For example, when the counter for counting the eco-points earning opportunity lost cases overflows, general advice suggesting a point like "points may be earned more effectively when trying to be in eco-driving" may be output.

Further, in this example, the counter may be reset every certain period of time or a certain travel distance. By doing this, for example, even when a traveling term of one trip is long, the frequency of the points earning opportunity lost case instead of the number of the points earning opportunity lost case is evaluated. Therefore, an appropriate output manner of the advice compensating for the difference of traveling terms can be realized.

Further, in this example, from the same point of view, many counters may be provided for each of the judgment items. In this case, the counter values may be kept constant during plural trips without being reset when the ignition switch is turned ON. In this case, the information output controlling section 210 judges the judgment item corresponding to an overflowed counter and outputs appropriate advice in accordance with the judgment item. It should be noted that the relationships between the advice contents and the judgment items may be previously stored in a map format.

Figure 10:
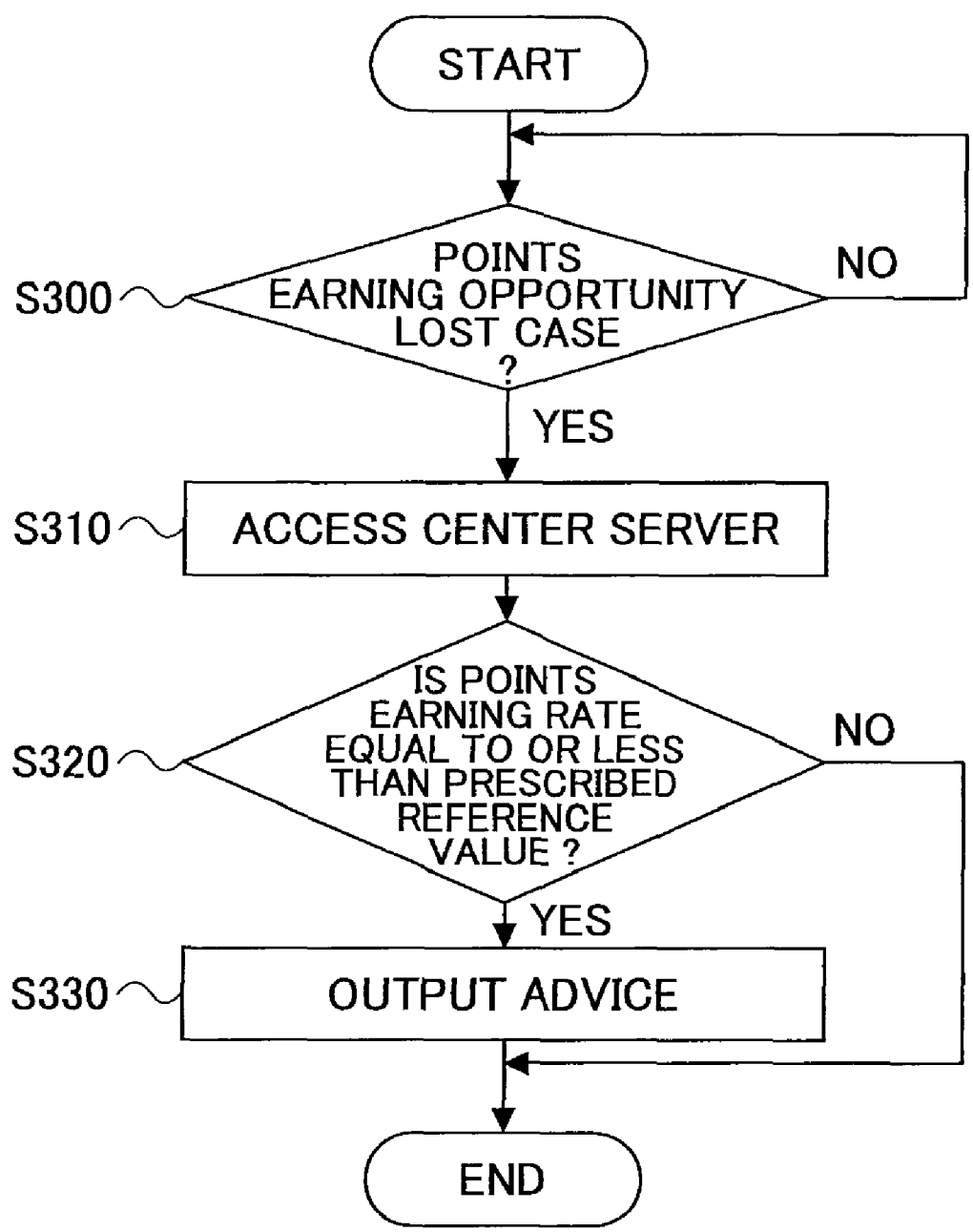
FIG. 10 is a flowchart showing still another (third) example of an information output controlling process realized by an information output controlling section 210.

FIG. 10 is a flowchart showing still another example of the image output control realized by the information output controlling section 210.

In step 300, the information output controlling section 210 determines whether the points earning opportunity lost case is detected based on the judgement result by the safety-drive judging section 207' and the eco-drive judging section 205'. When the points earning opportunity lost case is detected, the process goes to step 310.

In step 310, the information output controlling section 210 informs the center server 301' that the points earning opportunity lost case is detected. When receiving the information, the information managing section 305 of the center server 301' updates the data (eco-points earning rate or the safety points earning rate) stored in the points database 303'.

In this step 310, along with the information, the information output controlling section 210 sends a request to the information managing section 305 of the center server 301' through the communicating section 204 to send the updated eco-points earning rate or the safety points earning rate (data of the current driver). When receiving the request, the information managing section 305 transmits the requested eco-points earning rate or the safety points earning rate to the in-vehicle information terminal 201' that sent the request.

In step 320, the information output controlling section 210 determines whether any one of the points earning rates is equal to or less than a prescribed value based on the updated eco-points earning rate or the safety points earning rate from the center server 301'. When the points earning rate is equal to or less than the prescribed value, the process goes to step 330. Otherwise, this processing routine just ends. The prescribed value may be an average value of the eco-points earning rate or the safety points earning rate based on the data of each driver and calculated based on the data stored in the points database 303'.

In step 330, the information output controlling section 210 outputs appropriate advice in accordance with the points earning rates which is equal to or less than the prescribed value. For example, this time, when the points earning opportunity lost case of the safety driving is detected and the safety points earning rate is equal to or less than the prescribed value, the information output controlling section 210 may output general advice suggesting the point like "points may be earned more effectively when trying to be in safety driving". It should be noted that when this process of this step 330 is once executed, to avoid repeating the output of similar advice, the output of similar advice may be inhibited during the same trip.

Figure 11:
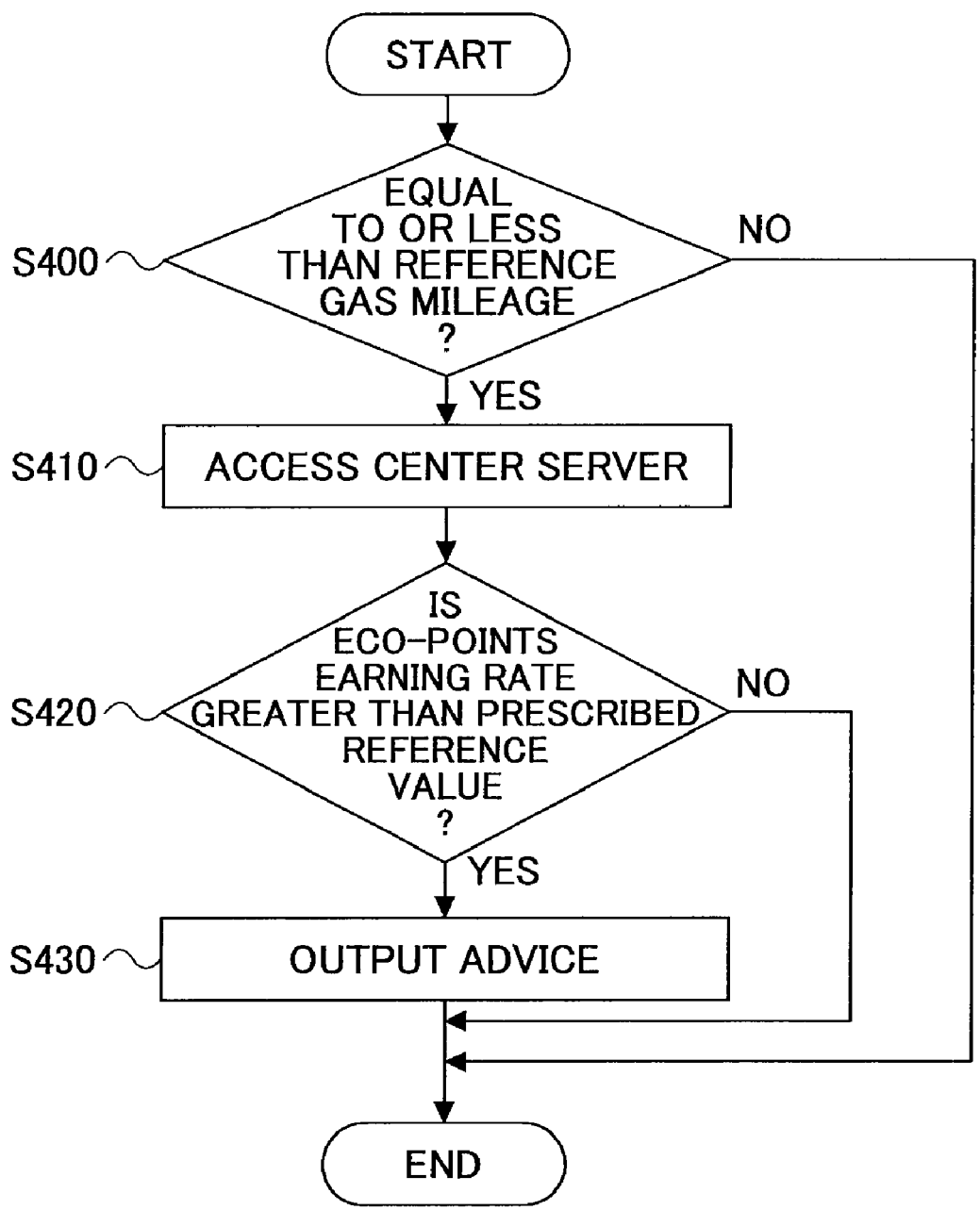
FIG. 11 is a flowchart showing still another (fourth) example of an information output controlling process realized by an information output controlling section 210.

FIG. 11 is a flowchart showing still another example of the image output control realized by the information output controlling section 210. The processing routine in FIG. 11 may be executed when the judgment condition of gas mileage (fifth judgment item from the top in FIG. 3) is judged by the eco-drive judging section 205'.

In step 400, the information output controlling section 210 determines whether the gas mileage in this time is equal to or less than a reference gas mileage based on the judgment result by the eco-drive judging section 205'. Namely, the information output controlling section 210 determines whether a point about the gas mileage is awarded in this trip. When the gas mileage in this trip is equal to or less than the reference gas mileage, namely when no point is awarded, the process goes to step 410. Otherwise, the process just ends.

In step 410, the information output controlling section 210 sends a request to the information managing section 305 of the center server 301' through the communicating section 204 to send the updated eco-points earning rate (data of the current driver). When receiving the request, the information managing section 305 transmits the requested eco-points earning rate to the in-vehicle information terminal 201' that sent the request.

In step 420, the information output controlling section 210 determines whether the eco-points earning rate from the center server 301' exceeds a prescribed reference value. When the eco-points earning rate exceeds the prescribed reference value, the process goes to step 430. Otherwise, this processing routine just ends. The prescribed reference value may be an average value of the eco-points earning rate based on the data of each driver or an exemplary earning rate greater than the average value.

In step 430, the information output controlling section 210 judges that the gas mileage of the vehicle is not improved regardless of appropriately earning the eco-points and output advice urging to self-check the vehicle by suggesting like "check the vehicle by your self or in a nearby service facility". By doing this, the diver can detect faulty maintenance and a trouble early to promote the safety driving and eco-driving. Namely, it becomes possible to avoid the situation where gas mileage is not improved regardless of the driver's trying to be in eco-driving status.

It should be noted that in this example, in a case where the eco-drive judging section 205' judges the judgment condition of gas mileage only once when the ignition switch is turned OFF, the process of the above steps 400 through 430 may be executed using backup power when the ignition switch is turned OFF. Otherwise, in a case where the gas mileage of this trip is equal to or less than a reference gas mileage, a flag may be set. Then, when the ignition is turned ON next time, the process of the above steps 420 and 430 may be executed.

Example 3

The example 3 generally refers to a configuration for promoting the use of services provided by the affiliated service providers. In the following, the same reference numerals are used for the same elements in the above examples 1 and 2 and the descriptions thereof are omitted.

FIG. 12 is a drawing showing a system configuration of the vehicle environmental service system 10" according to the example 3 of the present invention. FIG. 12 is a functional block diagram showing a main configuration of the in-vehicle information terminal 201". In the configuration in FIG. 12, the in-vehicle information terminal 201" further includes a guide route detecting section 214 in addition to the configuration of the in-vehicle information terminal 201 shown in FIG. 2.

The guide route detecting section 214 detects an appropriate guide route with respect to a desired destination of the driver input through an input device 216 (user interface) such as a remote controller and a microphone for voice recognition.

FIG. 13 is a drawing showing data stored in the personal information database 304" of the center server 301". In the personal information database 304", there is stored personal information with respect to each user. It should be noted that the example in FIG. 13 representatively shows only four users, but actually data of many users are stored.

In the example in FIG. 13, the data of the personal information database 304" include the information indicating the driver's skill level, the basic information indicating, for example, the type and equipment of the vehicle, the driver's hobby, the driver's frequently visited restaurants, the driver's main activity areas, the driver's frequently visited places, eco-points earning spots and safety points earning spots, previously used services, and necessary advertisement. The eco-points earning spots refer to the information indicating the places where the eco-points were earned as the past records and may be managed using the road link numbers as shown in FIG. 13. Similarly, the safety points earning spots refer to the information indicating the places where the safety points were earned as the past records and may be managed using the road link numbers as shown in FIG. 13. The previously used services refer to the information indicating what services are provided using the points earned by the driver in the past. It should be noted that the basic information of the vehicle and the data of the driver's hobby may be generated based on the information input by the driver. Other items may be generated based on the driver information obtained from the in-vehicle information terminal 201" as needed.

Figure 14:
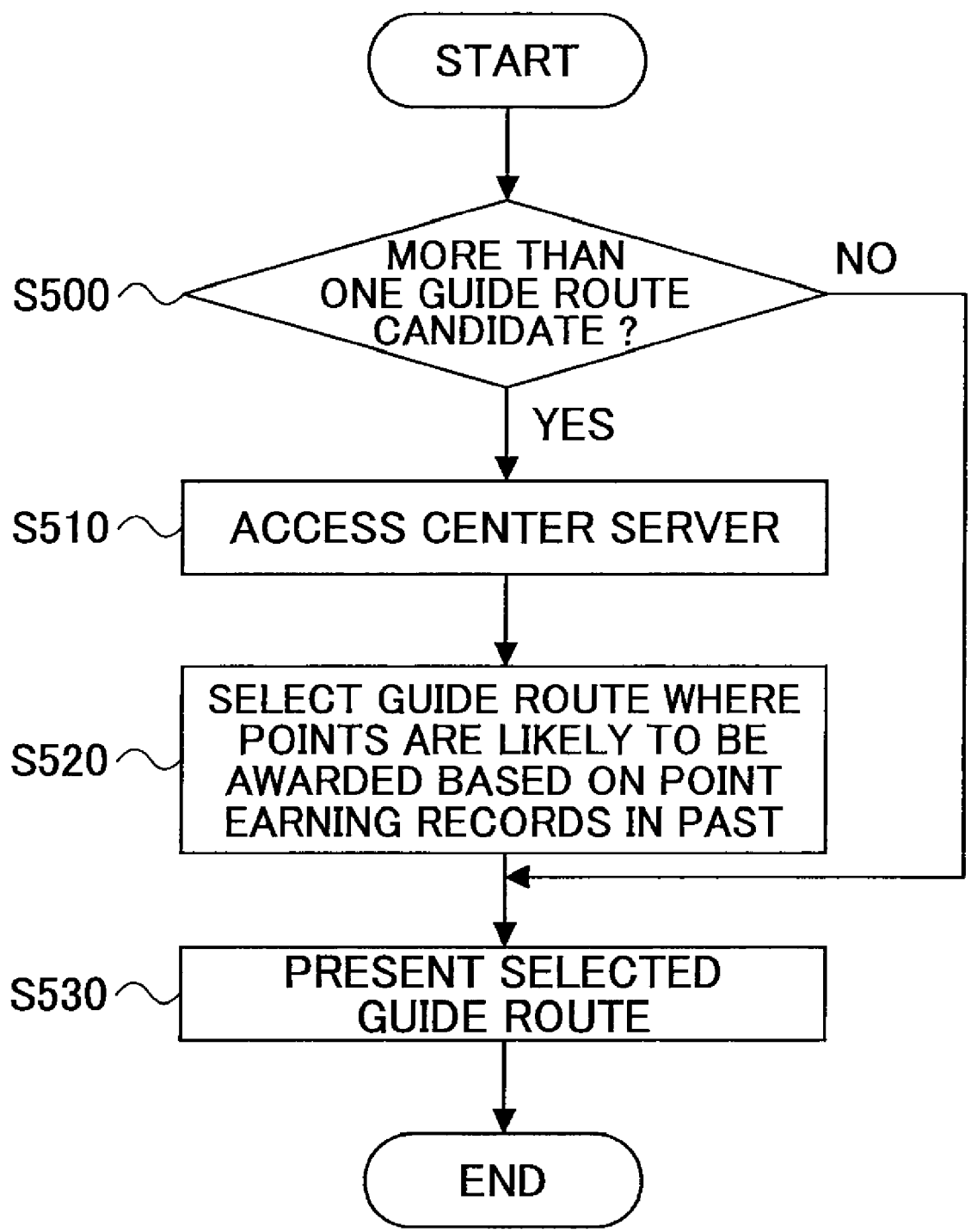
FIG. 14 is a flowchart showing an example of a route detecting process realized by a guide route detecting section 214.

FIG. 14 is a flowchart showing an example of the route detecting process realized by the guide route detecting section 214.

In step 500, the guide route detecting section 214 determines whether there are more than one guidable guide route as the result of the route detection. When there are detected more than one choice of the guide route, the process goes to step 510. Otherwise, the only one guide route is output (displayed) (step 530) and the process ends.

In step 510, the guide route detecting section 214 sends a request to the information managing section 305 of the center server 301" through the communicating section 204 to send the eco-points earning spots and safety points earning spots of the current driver in the personal information database 304". When receiving the request, the information managing section 305 transmits the requested eco-points earning spots and safety points earning spots to the in-vehicle information terminal 201" that sent the request.

In step 520, the guide route detecting section 214 selects one guide route as the first candidate where the points are most likely to be awarded based on the information (eco-points earning spots and safety points earning spots) obtained from the center server 301". For example, in a case where there are two guide routes "A" and "B" detected as the candidates, when the number of the eco-points earning spots and safety points earning spots in the guide route "A" is greater than the number of the eco-points earning spots and safety points earning spots in the guide route "B", the guide route "A" is selected as the first candidate.

In step 530, the guide route detecting section 214 outputs the selected guide route through the information output device 212. In a case where the information output device 212 is a display, the selected guide route is superimposed onto the map on the display. By doing this, the guide route where points are most likely to be awarded to the driver can be preferentially proposed, thereby allowing the driver to effectively obtain the points.

It should be noted that, in this example, the guide route detecting section 214 may determine the guide route to be proposed based on not only the comparison result of the number of the eco-points earning spots and the safety points earning spots but also the other elements such as the type of the road to be used, congestion information, the shortest distance, and the shortest time. For example, when there is no significant difference in the number of the eco-points earning spots and the safety points earning spots between plural guide routes, the fastest guide route or most frequently used guide route may be preferentially selected. On the other hand, when there is no significant difference in time and frequency of use in the past between plural guide routes, the guide route having the greatest number of the eco-points earning spots and the safety points earning spots may be preferentially selected.

Figure 15:
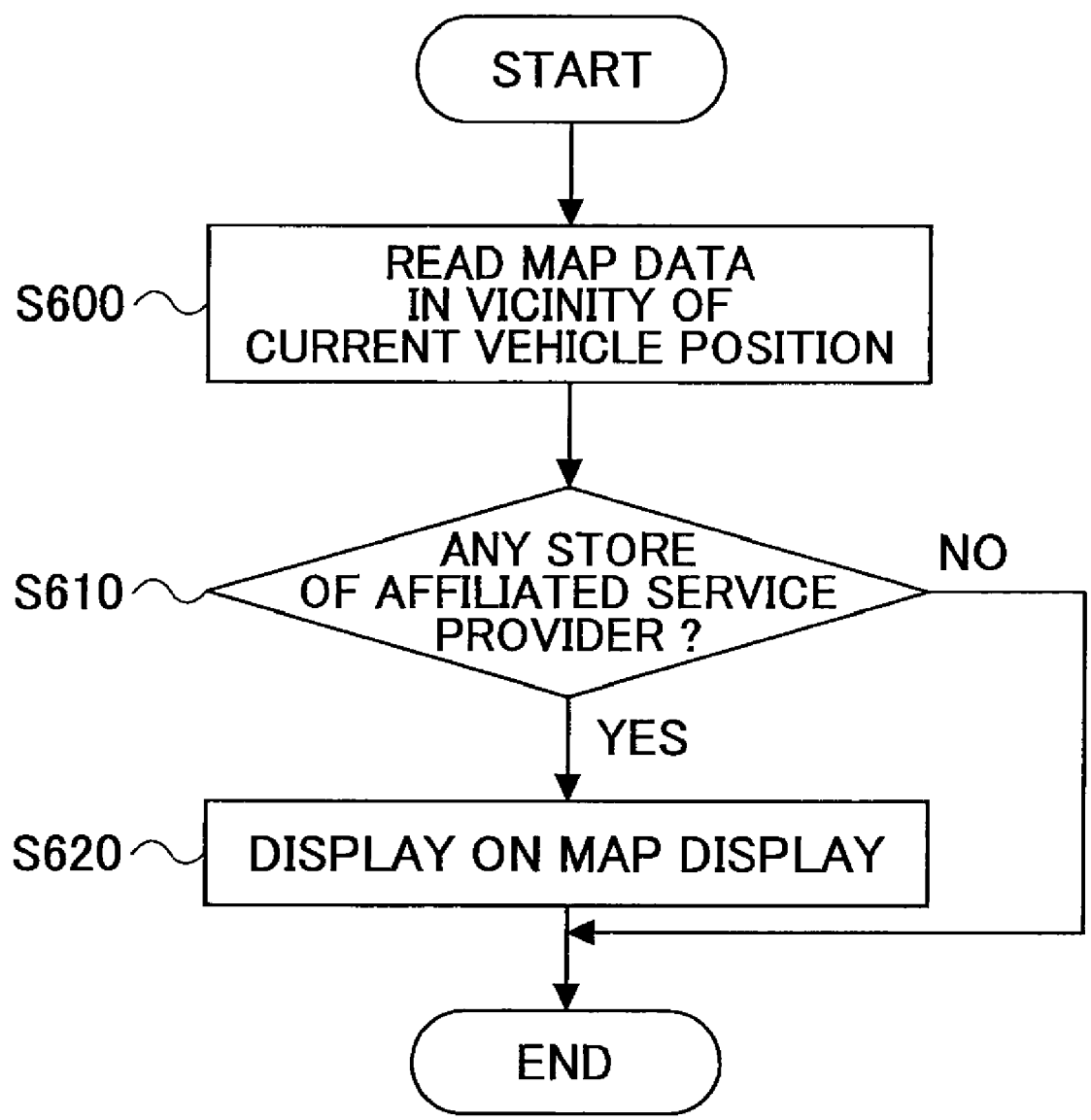
FIG. 15 is a flowchart showing a (first) example of an information output controlling process realized by an information output controlling section 210"

FIG. 15 is a flowchart showing an example of the information output controlling process realized by the information output controlling section 210". The processing routine in FIG. 15 may be executed by corresponding to the updating period of the map menu displayed on the information output device 212 (display).

In step 600, the information output controlling section 210" reads the map data in the vicinity of the current position of the vehicle from the map database 206.

In step 610, the information output controlling section 210" determines whether a store 501 of an affiliated service provider is newly appeared on the map displayed on the information output device 212. It should be noted that the position information of the stores 501 of the affiliated service providers are periodically obtained and updated from the center server 301" in advance and stored in a prescribed memory in a manner so that the relationship between the position information and the map data is comprehensible. Otherwise, the information output controlling section 210" may query the center server 301" through the communicating section 204 whenever needed.

It should be noted that in this step 610, during a guide route is being displayed, the information output controlling section 210" may determine whether a store 501 of an affiliated service provider is newly appeared on the guide route. In any case, when the store 501 of an affiliated service provider is newly appeared, the process goes to step 620. Otherwise, this processing routine just ends.

In step 620, the information output controlling section 210" superimposes the display indicating the position of the store 501 of the affiliated service provider onto the map currently displayed on the information output device 212. In this case, the information output controlling section 210" displays the position of the store 501 of the affiliated service provider in a manner so that the driver can understand that the store 501 is provided by the affiliated service provider. For example, the display of the store 501 of the affiliated service provider may be arranged so that the contrast, brightness, shape, or color of the display is different from the displays of the other unaffiliated service providers. By doing this, the drivers can easily understand the position of the stores 501 of the affiliated service providers, and therefore, drivers' using the services provided by the affiliated service providers is promoted. Further, the affiliated service providers enjoy the efficiency of the advertisement, thereby promoting the increase of the number of affiliated service providers.

It should be noted that in this example, information output controlling section 210" may display not only the store 501 of the affiliated service provider but also the store information (type of advertisement information) of the store 501. The store information may include the content of the service provided in the store 501 and the number of points necessary to use the service. The store information may be displayed along with the information of the total number of points of the current driver. In this case, the store information may be arranged to be displayed only when the driver requests the display. It should be noted that, similar to the position information of the store 501, the store information may be collectively obtained from the center server 301" in advance and stored in the memory of the in-vehicle information terminal 201", and updated by accessing the center server 301" periodically.

Figure 16:
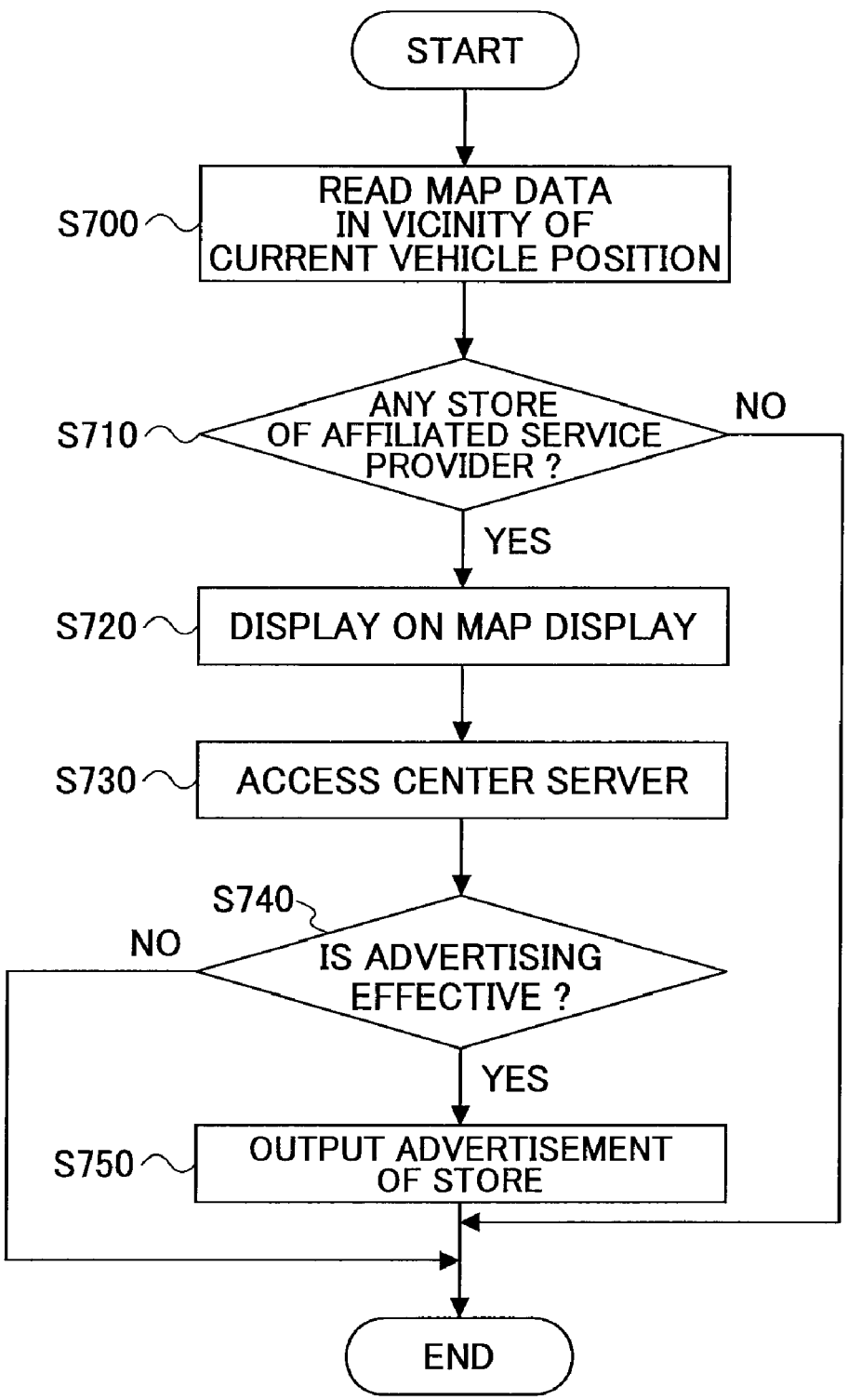
FIG. 16 is a flowchart showing another (second) example of an information output controlling process realized by an information output controlling section 210'.

FIG. 16 is a flowchart showing an example of the information output controlling process realized by the information output controlling section 210". The processing routine in FIG. 16 may be executed by corresponding to the updating period of the map menu displayed on the information output device 212 (display). The process in steps 700 through 720 may be the same as that in steps 600 through 620, therefore the description of the process in steps 700 through 720 is omitted.

In step 730, the information output controlling section 210" queries the information managing section 305 of the center server 301" whether there is the advertisement information of the store 501 detected in this processing routine through the communicating section 204. When there is the advertisement information, the information output controlling section 210" further queries the information managing section 305 of the center server 301" whether it is effective to output the advertisement information to the driver. It should be noted that the advertisement information may be notification of preferred point exchange rate for limited period only and notification of the addition of new service.

When receiving the inquiry, the information managing section 305 of the center server 301" refers to a service provider database (not shown) so as to determine whether there is the advertisement information of the store 501. Then, when there is the advertisement information, the information managing section 305 of the center server 301" refers to the personal information database 304" so as to determine whether it is effective to output the advertisement information of the store 501 to the driver. For example, when the store is a "fast-food store" and the driver's frequently visited restaurants is "general fast food", the information managing section 305 determines that it is effective to output the advertisement information of the store 501 and transmits the advertisement information of the store 501 to the in-vehicle information terminal 201" that sent the query. It should be noted that in this case, the information managing section 305 may consider the opening hours of the store 501 and the current time. On the other hand, for example, when the store is a sports gym and the driver's hobby is something like reading books entirely different from the sports and the driver's frequently visited places are other than a "sports gym", the information managing section 305 determines that it is not effective to output the advertisement information of the store 501 and transmits the result to the in-vehicle information terminal 201" that sent the query.

When no advertisement information is received or the notification that the advertisement information is not effective is received from the center server 301", the information output controlling section 210" determines that the advertisement information is not effective (NO in step 740) and ends this processing routine. On the other hand, when receiving the advertisement information from the center server 301", the information output controlling section 210" determines that the advertisement information is effective (YES in step 740) and outputs the advertisement information through the information output device 212. By doing this, it becomes possible to output only the advertisement information adapted to the driver's taste from among a potentially large amount of advertisement information, thereby realizing effective advertising.

It should be noted that in this example, when the center server 301" can obtain the vehicle position and the current guide route, the center server 301" may extract only the advertisement information effective for the driver and transmit the extracted advertisement information to the information output controlling section 210". For example, when the vehicle position (or the vicinity of the own vehicle position on the guide route) approaches the store 501, the information managing section 305 of the center server 301" refers to the personal information database 304" and estimates and determines whether the driver may be interested in the service provided by the store 501. Only when it is determined that the driver may be interested in the service, the information managing section 305 may transmit the advertisement information of the store 501 to the in-vehicle information terminal 201".

Further, in this example, whether the advertisement information of a certain service is effective for a certain driver may be judged by considering the number of points necessary to use the service and the current total number of points of the driver. This is because when the current total number of points of the driver is too far from the number of points necessary to use the service, it is not sufficiently effective even when the advertisement of the service is being placed.

Figure 17:
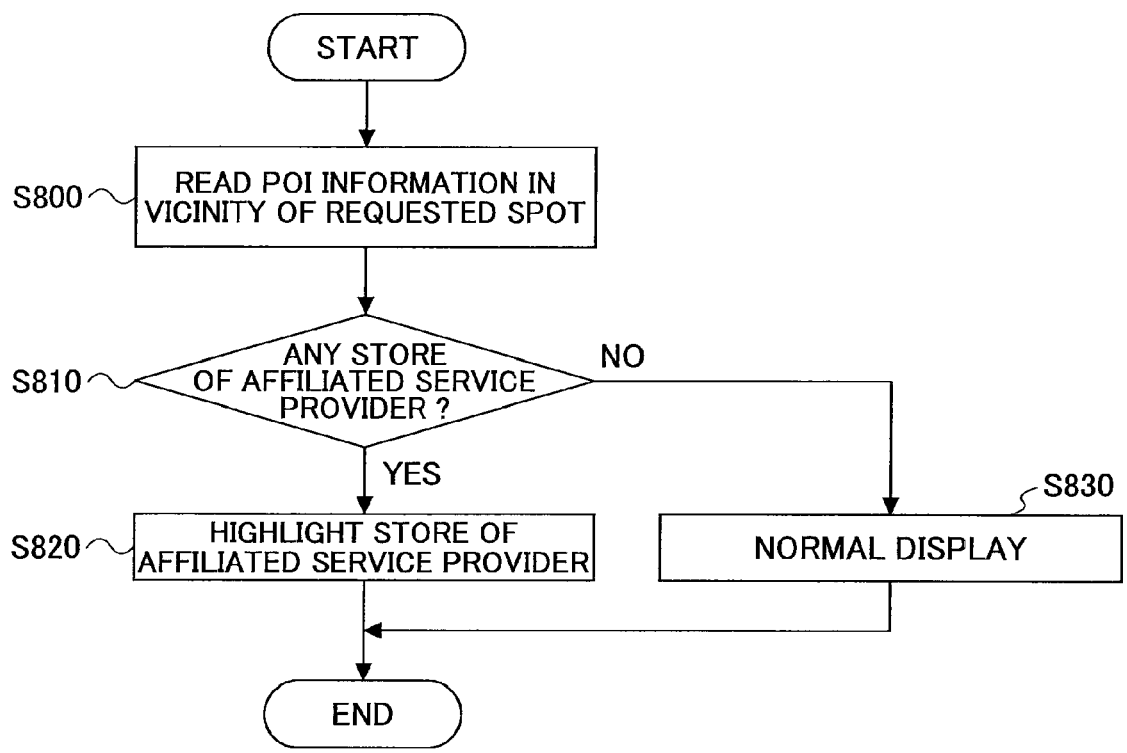
FIG. 17 is a flowchart showing still another (third) example of an information output controlling process realized by an information output controlling section 210"

FIG. 17 is a flowchart showing an example of the information output controlling process realized by the information output controlling section 210". The processing routine in FIG. 17 may be executed when a driver (or fellow passenger) requests the POI information of the vicinity of the destination through the input device 216.

In step 800, the information output controlling section 210" reads the POI information of the vicinity of the requested point from the map database 206.

In step 810, the information output controlling section 210" determines whether the information of the store 501 of the affiliated service provider is included in the read POI information. When the information of the store 501 of the affiliated service provider is included, the process goes to step 820. Otherwise, the read POI information is output in a usual manner (step 830).

In step 820, the information output controlling section 210" preferentially displays the information of the store 501 of the affiliated service provider rather than the information of the other service providers. For example, when the POI information is listed in a table format, the information output controlling section 210" may change the order of the list so that the information of the store 501 of the affiliated service provider is displayed on the top of the list or may change the manner of the display so that the information of the store 501 of the affiliated service provider is more highly visible than that of the other service providers by highlighting the information. By doing this, the driver can easily become aware of the information of the store 501 of the affiliated service provider in the vicinity of the destination, and the driver's using the services provided by the affiliated service providers is promoted. Further, the affiliated service providers enjoy the efficiency of the advertisement, thereby promoting the increase of the number of affiliated service providers.

Figure 18:
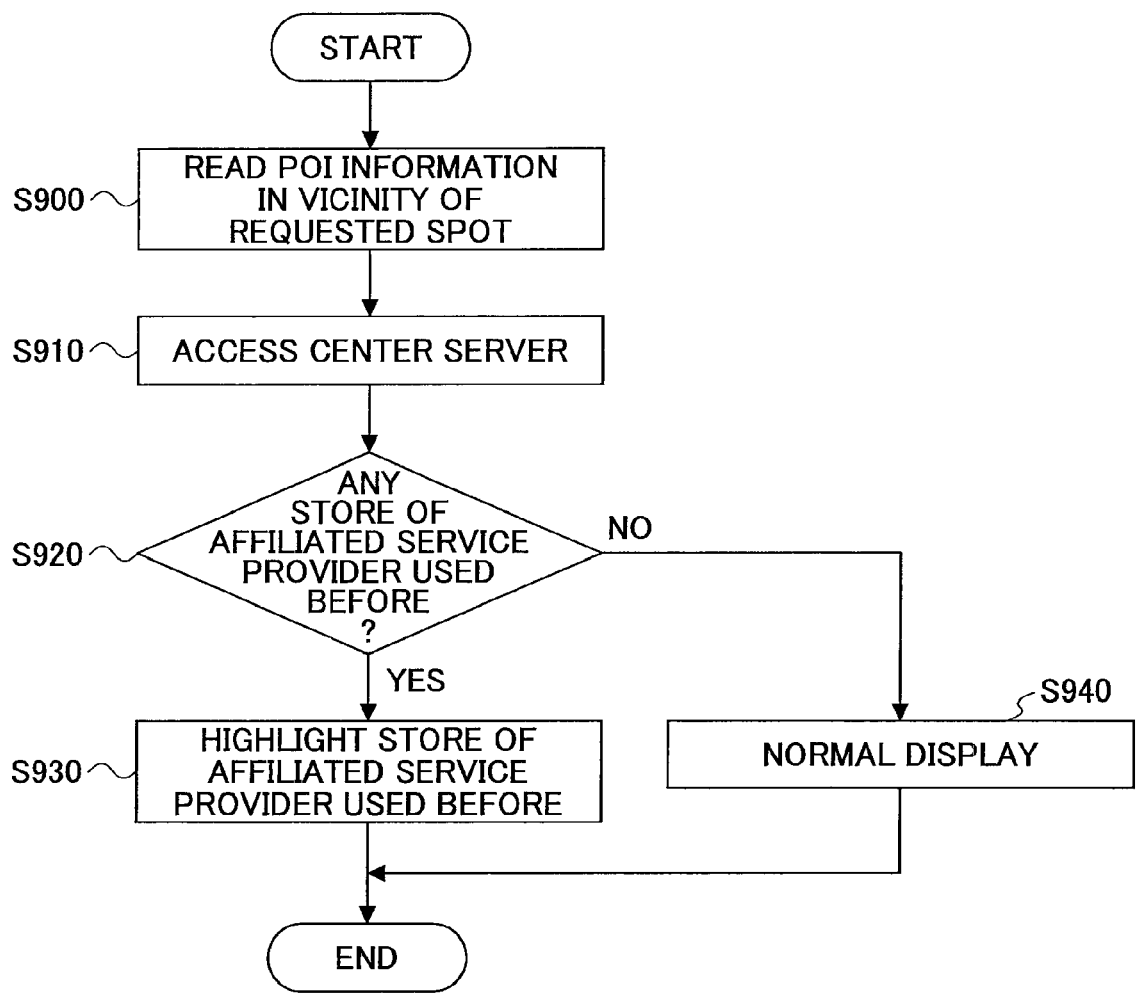
FIG. 18 is a flowchart showing still another (fourth) example of an information output controlling process realized by an information output controlling section 210".

FIG. 18 is a flowchart showing an example of the information output controlling process realized by the information output controlling section 210". The processing routine in FIG. 18 may be executed when a driver (or fellow passenger) requests the POI information of the vicinity of the destination through the input device 216.

In step 900, the information output controlling section 210" reads the POI information of the vicinity of the requested point from the map database 206.

In step 910, the information output controlling section 210" queries the information managing section 305 of the center server 301" whether there is the store 501 of the affiliated service provider that has ever been used by the driver among the stores 501 of the affiliated service provider in the vicinity of the destination through the communicating section 204. When receiving the query, the information managing section 305 of the center server 301" refers to the personal information database 304" so as to determine whether there is the store 501 of the affiliated service provider that has ever been used by the driver in the vicinity of the destination. For example, in a case where the user ID of the driver is "000001" and there is the store 501 of the affiliated service provider "A" in the vicinity of the destination, according to an example in FIG. 13, the driver has previously used the affiliated service provider "A". In this case, the information managing section 305 informs the in-vehicle information terminal 201" about the fact that the affiliated service provider "A" has been used before, the in-vehicle information terminal 201" having sent the inquiry. On the other hand, for example, in a case where the user ID of the driver is "000003" and there is no store 501 of the affiliated service provider in the vicinity of the destination, the information managing section 305 informs the in-vehicle information terminal 201" about the fact that there is no store 501 of the affiliated service provider in the vicinity of the destination, the in-vehicle information terminal 201" having sent the inquiry.

When no information of the affiliated service provider that has been used before is received or the notification that there is no affiliated service provider previously used is received from the center server 301", the information output controlling section 210" determines that there is no store 501 of the affiliated service provider used before (NO in step 920) and outputs the read POI information in a usual manner (step 940). In this case, the information of the store 501 of the affiliated service provider (that has not been used before) may be highlighted so as to be more highly visible than that of the other unaffiliated service providers.

On the other hand, when receiving the information of the affiliated service provider used before from the center server 301", the information output controlling section 210" determines that there is the store 501 of the affiliated service provider that has been used before (YES in step 930) and preferentially displays the information of the store 501 of the affiliated service provider used before rather than that of the other service providers. For example, when the POI information is listed in a table format, the information output controlling section 210" may change the order of the list so that the information of the store 501 of the affiliated service provider is displayed on the top of the list or may change the manner of the display so that the information of the store 501 of the affiliated service provider is more highly visible than that of the other service providers by highlighting the information. By doing this, the driver can easily be aware of the information of the store 501 of the affiliated service provider used before in the vicinity of the destination, and the driver's use of the services provided by the affiliated service providers is promoted. Further, the affiliated service providers enjoy the efficiency of the advertisement, thereby promoting the increase of the number of affiliated service providers.

Further, in this example, when outputting the POI information, the information output controlling section 210" may consider the number of times that the user previously used the service of the affiliated service provider. In this case, the information output controlling section 210" displays the information of the affiliated service providers in the descending order of the number of times used.

Preferred examples of the present invention are described above. However, the present invention is not limited to the examples, and various modifications and alterations of the present invention may be made without departing from the scope of the present invention.

For example, in the above example, the points may be exchanged between vehicles (drivers). For example, a prescribed number of points may be transferred between drivers from the driver of the vehicle given way to by the other vehicle to the driver of the vehicle that gave way to the vehicle.

Further, in the above examples, the personal information databases 304, 304', and 304" are provided at the center server but may be provided in each vehicle. In this case, the database of the personal information of the driver using the vehicle is generated. Similar to the point calculation method, an evaluation method (evaluation logic) of the skill level may be distributed from the center server.

Still further, in the above examples, the points databases 303 and 303' are provided in the center server but may be provided in each vehicle. In this case, the database of the point information of the driver using the vehicle is generated.

Still further, in the above examples, the point calculating section 203 is provided in the in the in-vehicle information terminal 201, 201', and 201" but may be provided in the center server 301, 301', and 301".

Still further, in the above examples, no punitive action of subtracting points is taken due to fear of negative psychological influence caused by the punitive point subtraction. However, the points may be subtracted in anti-ecological driving and dangerous driving statuses. In this case, similar to the cases shown in FIGS. 8 through 10, a piece of advice may be output when the points are subtracted or in accordance with the number of times or the frequency that the points are subtracted.

Still further, in the above examples, the center servers 301, 301', and 301" themselves do not provide any service to be used with the points. However, the center servers 301, 301', and 301" may provide various services that can be used in exchange for the points.

The present application claims priority from Japanese Patent Application No. 2006-121163 filed on Apr. 25, 2006, the entire contents of which are hereby incorporated herein by reference.

The invention claimed is:

1. A vehicle environmental service system comprising:
   an in-vehicle information terminal mounted in a vehicle;
   a center server provided in a center;
   a provider terminal managed by an affiliated service provider providing various services to users;
   a point calculating unit included in the in-vehicle information terminal and provided for determining whether safety driving and ecological driving is being performed with respect to each of the users based on a prescribed criterion and calculating a number of points to be awarded based on the result of the determination, wherein the awarded points may be redeemed to obtain a service at a lower cost than usual or with a greater added value than usual;
   a database included in the center server and provided for managing a total number of points obtained by accumulating the number of points to be awarded with respect to each of the users;
   a service providing unit included in the provider terminal and provided for providing a prescribed service in exchange for a prescribed number of the points in the database;
   an advertisement generating unit included in the provider terminal and provided for generating advertisement information of the affiliated service provider; and
   a unit enabling the in-vehicle information terminal to receive the advertisement information from the provider terminal directly or through the center server,
   wherein a point calculation method in the point calculating unit is varied in accordance with the external environment of the vehicle by relaxing the prescribed criteria in a case where the external environment is relatively disadvantageous to the eco-driving or the safety driving compared with a case where external environment is relatively advantageous to the eco-driving or the safety driving, or by awarding more points when the prescribed criterion is being fulfilled.

2. The vehicle environmental service system according to claim 1, wherein
   a database of driving proficiency indicating an index of driving skill or driving technique with respect to each of the users is provided and a point calculation method in the point calculating unit is varied in accordance with the driving proficiency.

3. The vehicle environmental service system according to claim 1, wherein
   a database of safety driving functions or ecological driving functions is installed in the vehicle owned by the user with respect to each of the users and a point calculation method in the point calculating unit is varied in accordance with a situation of the safety driving functions or the ecological driving functions.

4. The vehicle environmental service system according to claim 1, wherein
   a point calculation method in the point calculating unit is varied in accordance with an external environment of the vehicle.

5. The vehicle environmental service system according to claim 1, further comprising:
   a driving advice presenting unit included in the vehicle and provided for presenting driving advice for earning points.

6. The vehicle environmental service system according to claim 1, wherein
   the driving advice for earning the points is presented in a points earning opportunity lost case where the point is not earned because the prescribed criterion is not fulfilled in a situation where the point can be earned.

7. The vehicle environmental service system according to claim 1, wherein
   the driving advice for earning the points is presented when the number of times or a frequency of a points earning opportunity lost case where the point is not earned because the prescribed criterion is not fulfilled in a situation where the point can be earned exceeds a prescribed reference value.

8. The vehicle environmental service system according to claim 1, further comprising:
a guiding unit included in the vehicle and provided for presenting guidance to make a diagnosis of the vehicle when it is determined that the points due to ecological driving are earned but the gas mileage is not improved.

9. The vehicle environmental service system according to claim 8, further comprising:
a route guiding unit included in the vehicle and provided for performing route guidance by preferentially selecting a route on which the point is most likely to be earned based on a driving record in the past.

10. The vehicle environmental service system according to claim 1, further comprising:
a service guiding unit included in the vehicle and provided for performing guidance to a service available in a facility when the vehicle approaches the facility of the affiliated service provider where the service is available or when there is the facility located on a guide road of the vehicle.

11. The vehicle environmental service system according to claim 10, wherein
the service guiding unit performs guidance in a manner so that the user is preferentially guided to a service adapted to the user's taste rather than to the other services.

12. The vehicle environmental service system according to claim 1, further comprising:
a POI (Point Of Interest) information presenting unit included in the vehicle and provided for preferentially presenting information of the affiliated service provider when POI information is being presented.

13. The vehicle environmental service system according to claim 12, wherein
the POI (Point Of Interest) information presenting unit preferentially presents information of the affiliated service provider that has previously provided a service to the user.

14. The vehicle environmental service system according to claim 1, further comprising:
a personal information database included in the center server and provided for collecting and storing information of each user of the in-vehicle information terminal, wherein
the advertisement generating unit generates the advertisement information by communicating with the center server and referring to the information in the personal information database.

* * * * *